United States Patent
Kyrlidis et al.

(10) Patent No.: US 9,053,871 B2
(45) Date of Patent: Jun. 9, 2015

(54) HIGH SURFACE AREA AND LOW STRUCTURE CARBON BLACKS FOR ENERGY STORAGE APPLICATIONS

(71) Applicant: Cabot Corporation, Boston, MA (US)

(72) Inventors: Agathagelos Kyrlidis, Cambridge, MA (US); Raymond M. Sawka, Westford, MA (US); Geoffrey D. Moeser, Groton, MA (US); Pavel A. Kossyrev, Providence, RI (US); Ned J. Hardman, Belmont, CA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/525,601

(22) Filed: Oct. 28, 2014

(65) Prior Publication Data

US 2015/0044516 A1    Feb. 12, 2015

Related U.S. Application Data

(63) Continuation of application No. 13/505,201, filed as application No. PCT/US2010/054388 on Oct. 28, 2010, now Pat. No. 8,895,142.

(60) Provisional application No. 61/257,226, filed on Nov. 2, 2009.

(51) Int. Cl.
   *C09C 1/48* (2006.01)
   *C09C 1/56* (2006.01)
   (Continued)

(52) U.S. Cl.
   CPC ......... *H01G 11/42* (2013.01); *C09C 1/56* (2013.01); *C09C 1/48* (2013.01); *Y10T 428/2982* (2015.01);
   (Continued)

(58) Field of Classification Search
   None
   See application file for complete search history.

(56) References Cited

U.S. PATENT DOCUMENTS

| 1,987,644 A | 1/1935 | Spear et al. |
| 3,642,466 A | 2/1972 | McCaulay et al. |

(Continued)

FOREIGN PATENT DOCUMENTS

| CN | 1853306 A | 10/2006 |
| JP | 2002063905 | 2/2002 |

(Continued)

OTHER PUBLICATIONS

Beck, et al., "Electrochemical Supercapacitors Based on Industrial Carbon Blacks in Aqueous H2SO4", Journal of Applied Electrochemistry, vol. 31, pp. 845-853, 2001 [retrieved on Dec. 10, 2012]. Retrieved from the internet: http://www.sprinerlink.com/content/h678j453jwp560633.

(Continued)

*Primary Examiner* — Holly Le
*Assistant Examiner* — Thomas Mangohig

(57) ABSTRACT

The present invention, in part, relates to a carbon black having a) a nitrogen BET surface area (BET) of from about 600 m²/g to about 2100 m²/g, b) a CDBP value in mL/100 g of from about (−2.8+(b*BET)) to about (108+(b*BET)), where b is 0.087 and BET is expressed in m2/g, and c) an apparent density (p, g/cm³) of at least about 0.820+q*BET, where q=−2.5×10⁻⁴, as determined at a compressive force (P) of 200 kgf/cm² on dry carbon black powder. Energy storage devices, such as electrochemical double layer capacitors (EDLC's), containing the carbon black are also disclosed. Methods for making the carbon blacks and EDLC's made with them are also provided.

26 Claims, 9 Drawing Sheets

(51) Int. Cl.
*H01G 9/042* (2006.01)
*H01G 11/42* (2013.01)
*H01G 11/24* (2013.01)
*H01G 11/32* (2013.01)
*H01G 11/38* (2013.01)
*H01M 4/62* (2006.01)
*H01G 11/04* (2013.01)
*H01M 4/14* (2006.01)
*H01M 4/86* (2006.01)
*H01M 10/06* (2006.01)
*H01M 12/00* (2006.01)
*C09C 1/58* (2006.01)
*H01M 4/133* (2010.01)
*H01M 4/1393* (2010.01)
*H01M 4/583* (2010.01)
*H01M 8/10* (2006.01)

(52) U.S. Cl.
CPC ............ *H01G 11/24* (2013.01); *H01G 11/32* (2013.01); *H01G 11/38* (2013.01); *H01M 4/133* (2013.01); *H01M 4/1393* (2013.01); *H01M 4/583* (2013.01); *H01M 4/625* (2013.01); *H01M 8/1002* (2013.01); *Y02E 60/13* (2013.01); *C01P 2002/86* (2013.01); *C01P 2004/62* (2013.01); *C01P 2004/64* (2013.01); *C01P 2006/12* (2013.01); *H01G 11/04* (2013.01); *H01M 4/14* (2013.01); *H01M 4/8673* (2013.01); *H01M 10/06* (2013.01); *H01M 12/005* (2013.01); *H01M 2220/20* (2013.01); *H01M 2250/20* (2013.01)

(56) References Cited

U.S. PATENT DOCUMENTS

| | | | |
|---|---|---|---|
| 4,789,321 A * | 12/1988 | Dingus | 425/222 |
| 5,115,378 A | 5/1992 | Tsuchiya et al. | |
| 5,260,855 A | 11/1993 | Kaschmitter et al. | |
| 5,554,739 A | 9/1996 | Belmont | |
| 5,571,311 A | 11/1996 | Belmont et al. | |
| 5,581,438 A | 12/1996 | Halliop | |
| 5,585,999 A | 12/1996 | De Long et al. | |
| 5,630,868 A | 5/1997 | Belmont et al. | |
| 5,646,815 A | 7/1997 | Owens et al. | |
| 5,689,016 A | 11/1997 | Weider et al. | |
| 5,707,432 A | 1/1998 | Adams et al. | |
| 5,713,988 A | 2/1998 | Belmont et al. | |
| 5,803,959 A | 9/1998 | Johnson et al. | |
| 5,811,204 A | 9/1998 | Nitzan | |
| 5,837,045 A | 11/1998 | Johnson et al. | |
| 5,851,280 A | 12/1998 | Belmont et al. | |
| 5,972,826 A | 10/1999 | Boes et al. | |
| 6,042,643 A | 3/2000 | Belmont et al. | |
| 6,123,759 A * | 9/2000 | Mise et al. | 106/31.9 |
| 6,197,870 B1 | 3/2001 | Sakakibara | |
| 6,466,429 B1 | 10/2002 | Volfkovich et al. | |
| 6,522,522 B2 | 2/2003 | Yu et al. | |
| 6,628,504 B2 | 9/2003 | Volfkovich et al. | |
| 6,706,079 B1 | 3/2004 | Shmatko et al. | |
| 6,804,108 B2 | 10/2004 | Nanjundiah et al. | |
| 7,006,346 B2 | 2/2006 | Volfkovich et al. | |
| 7,110,242 B2 | 9/2006 | Adrianov et al. | |
| 7,236,349 B2 | 6/2007 | Miyaki et al. | |
| 7,582,902 B2 | 9/2009 | Tano et al. | |
| 2002/0012224 A1 | 1/2002 | Wei et al. | |
| 2003/0180613 A1 | 9/2003 | Ma | |
| 2004/0002002 A1 | 1/2004 | Mizuta et al. | |
| 2004/0085709 A1 | 5/2004 | Nanjundiah et al. | |
| 2005/0063893 A1 | 3/2005 | Ayala et al. | |
| 2005/0233183 A1 | 10/2005 | Hampden-Smith et al. | |
| 2006/0234057 A1 | 10/2006 | Kakiuchi et al. | |
| 2007/0104981 A1 | 5/2007 | Lam et al. | |
| 2007/0148335 A1 | 6/2007 | Tanaka et al. | |
| 2007/0197715 A1 | 8/2007 | Yanagioka | |
| 2008/0032181 A1 | 2/2008 | Yamamoto | |
| 2009/0208751 A1 | 8/2009 | Green et al. | |
| 2009/0325068 A1 | 12/2009 | Boden et al. | |
| 2010/0015531 A1 | 1/2010 | Dickinson et al. | |
| 2012/0211703 A1 | 8/2012 | Atanassova et al. | |

FOREIGN PATENT DOCUMENTS

| | | |
|---|---|---|
| WO | WO 96/18688 A1 | 6/1996 |
| WO | WO 97/47697 A1 | 12/1997 |
| WO | WO 97/47699 A1 | 12/1997 |
| WO | WO 2005/027255 A1 | 3/2005 |
| WO | WO 2009/105172 A2 | 8/2009 |

OTHER PUBLICATIONS

Everett, et al., "A Study of the Effects of Heat Treatment on the Physical Properties of the Carbon Black Vulcan 3", J. Chem. Soc., Faraday Trans. 10, vol. 82, pp. 2915-2928 (1986).

Jänes, et al., "Characterisation of Activated Nanoporous Carbon for Supercapacitor Electrode Materials", Carbon 45, pp. 1226-1233 (2007).

Richner, et al., "Studies of Activated Carbon and Carbon Black for Supercapacitor Applications", date < 2000, retrieved from the internet: http://ecl.web.psl.ch/publications/cap_pub/roy.pdf p. 1.

Wampler, "Improved Test for Determination of Carbon Black Structure", presentation at Carbon Black World 2004, Nov. 15-18, 2004, [retrieved on Dec. 10, 2020]. Retrieved from the internet: http://www.sidrich.com/pdf/papers/paper200411.pdf, p. 5, paragraphs 1-2.

Kötz, et al., "Principles and Applications of Electrochemical Capacitors", Electrochimica Acta, vol. 45 (2000), pp. 2483-2498.

Pavlov, et al., "Influence of Expander Components on the Processes at the Negative Plates of Lead-Acid Cells on High-Rate Partial-State-of-Charge Cycling. Part II. Effect of Carbon Additives on the Processes of Charge and Discharge of Negative Plates", Journal of Power Sources, vol. 195 (2010), pp. 4444-4457.

Pavlov, et al., "Mechanism of Action of Electrochemically Active Carbons on the Processes that Take Place at the Negative Plates of Lead-Acid Batteries", Journal of Power Sources, vol. 191 (2009), pp. 58-75.

* cited by examiner

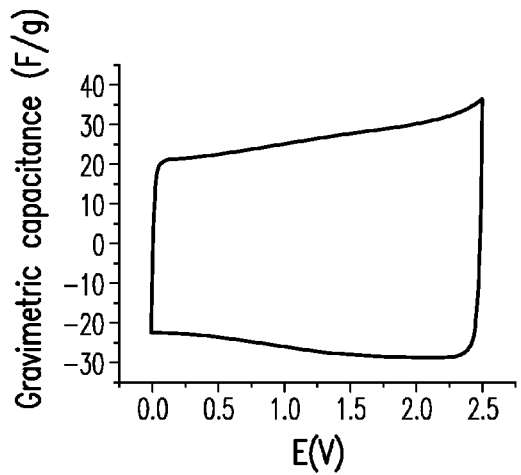
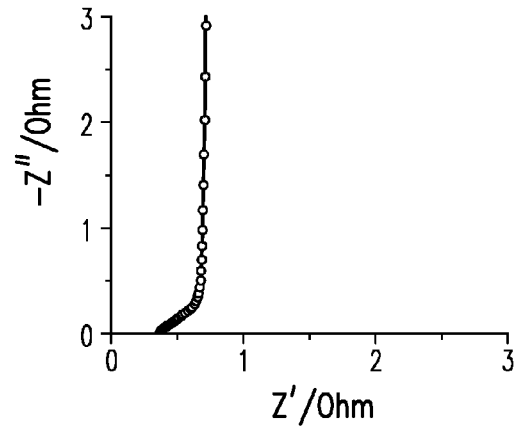
FIG. 4a    FIG. 4b
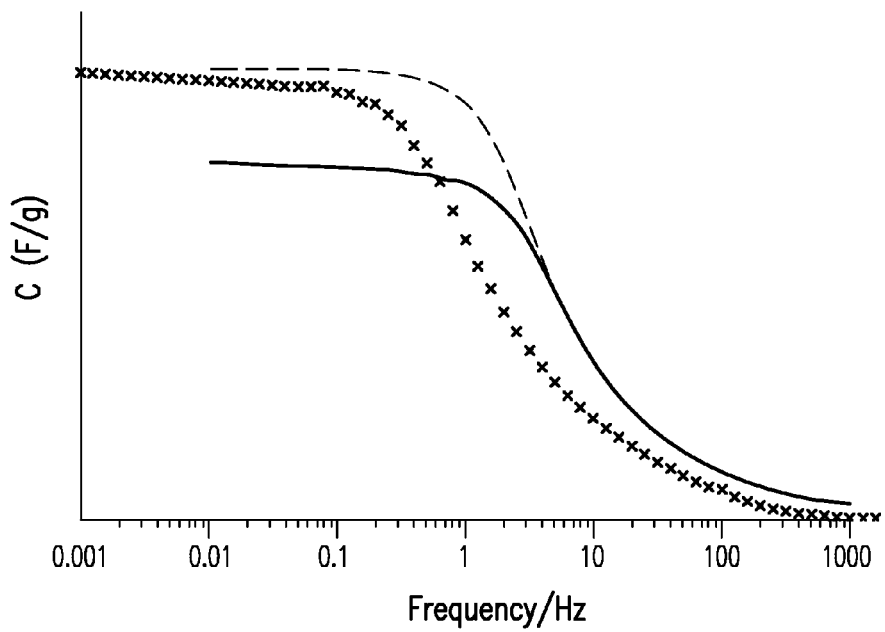
FIG. 5

HIGH SURFACE AREA AND LOW STRUCTURE CARBON BLACKS FOR ENERGY STORAGE APPLICATIONS

This application is a continuation of and claims priority to U.S. patent application Ser. No. 13/505,201, filed on Apr. 30, 2012, which is a §371 national phase application of and claims priority to International Patent Application No. PCT/US2010/054388, filed on Oct. 28, 2010, which claims priority to U.S. Provisional Patent Application No. 61/257,226, filed on Nov. 2, 2009. These applications are incorporated in their entirety by reference herein.

The present invention relates to carbon blacks, and, particularly, high surface area, low structure carbon blacks. The present invention additionally relates to energy storage devices that use these carbon blacks. More particularly, the present carbon black can be used in an Electrochemical Double Layer Capacitor (EDLC), also known as an electrochemical capacitor, supercapacitor, or ultracapacitor. The EDLC can be a symmetric EDLC or other EDLC configurations. The application of the described carbon black is not restricted to the EDLC, but also may include other areas, including but not restricted to, the areas in the energy market such as batteries and fuel cells. Moreover, other devices that utilize the phenomenon of pseudocapacitance or utilize a hybrid design of a battery with capacitor can benefit as well from the utilization of these carbon blacks. The present invention also relates to methods of production of these unique carbon blacks and energy storage devices made with them.

In a conventional capacitor, energy is stored by the removal of charge carriers, typically electrons, from one metal plate and depositing them on another. This charge separation creates a potential between the two plates, which can be harnessed in an external circuit. In contrast with traditional capacitors, EDLC's typically do not have a conventional dielectric. Rather than two separate plates separated by an intervening substance, EDLC's can use "plates" that are in fact two layers of the same substrate, and their electrical properties, the so-called "electrical double layer", result in the effective separation of charge despite the very thin (e.g., on the order of nanometers) physical separation of the layers. The lack of need for a bulky layer of dielectric permits the packing of "plates" with much larger surface area into a given size, resulting in very high capacitances in practical sized packages.

EDLC are readily available in small size and lightweight units as well as large units. The EDLC are used in a variety of applications in, for instance, hand-held devices (miniature electronic equipment), back-up power supply, auxiliary power supply for automotive vehicles, and the like. Various studies have been performed to better understand the effect of material properties on device performance. In general, devices with lower internal resistance or Equivalent Series Resistance (ESR) are desired. The internal resistance of batteries, such as lead-acid batteries, depends to a great extent on the state of their charge and the temperature of the environment in which they operate. The internal resistance of a battery at a low-level state of charge, for example, has an increased value in comparison to the internal resistance of a fully charged battery, and this characteristic limits the power parameters of partially discharged batteries. EDLC's have extremely low ESR, which can be less reliant on the state of their charge as compared to rechargeable batteries. In addition to low ESR, the EDLC also are preferred to simultaneously have a high volumetric capacitance (electrical capacitance per unit volume). The volumetric capacitance is defined as the electrical capacitance of material per unit mass, also known as gravimetric capacitance (a value in Farads per gram), multiplied by the density of electrode (a value in grams per cubic centimeter). The capacitance in general increases with increasing the surface area of the carbon material. Gaining both of these device characteristics, the low ESR and the high volumetric capacitance, from the same material has proven to be a distinct challenge.

The electrodes used in EDLC are generally fabricated by forming a porous body layer, also known as an electrode membrane or electrode membrane layer (or simply referred to herein as an "electrode"), on a current collector, usually aluminum or another conductive substrate. Both electrode and current collector have electronic conductivity. The electrode is generally formed by applying a solvent containing a dispersion or slurry that contains porous carbonaceous particles, which is usually micron-sized activated carbon particles with an added conductive component (conductive additive or filler), which is also usually a carbonaceous material, a binder, and a solvent onto the collector. Several alternative methods exist as well that include a dry extrusion process and pressing or compacting the dry materials together.

Independent of the production method, the final electrode usually contains about 90-95 wt % of activated carbon, about 5-10 wt % of conductive additive, and some polymeric binder. The conductive additive in the electrode is used to give sufficient electronic conductivity to the electrode as well as to eliminate the "dead" space, which otherwise had to be filled with an electrolyte—one of the most expensive components of the EDLC. By adjusting the contents of the conductive additive in the electrode, the electronic part of the ESR can be tuned. At the same time, the ionic part of conductivity (the ability of electrolyte ions to move to and from the available surface of the carbon) is primarily governed by the porosity of activated carbon and tortuosity of pores within the electrode and individual carbon particles. Therefore, thick electrodes (thickness>about 50 microns) will result in the increased ESR, as both the ionic and the electronic parts of ESR are higher for thick electrodes compared with thin electrodes. The use of activated carbon for thin electrodes, as presently understood, can be problematic due to the broad particle size distribution (from around about 0.1 to about 100 microns) of activated carbon particles. Also, gaining both low ESR and high volumetric capacitance from the same material has previously been problematic.

SUMMARY OF THE INVENTION

The present innovation is based in part on a presently recognized need to develop a high surface area carbon black, which also has a low structure, and which can be useful in energy storage devices. Carbon blacks with such characteristics and use are not believed to have been previously commercially available, nor have their possible benefits in such uses as electrochemical capacitors previously been realized or fully appreciated, until the present development of such carbon blacks and their uses including their use as electrodes for supercapacitors and other energy storage devices.

Another feature of the present invention is to provide electrically conductive carbon blacks having high surface porosity.

Yet another feature of the present invention is to provide carbon blacks for supercapacitors and other energy storage devices, systems, and uses.

Another feature of the present invention is to provide carbon blacks for EDLC's and the devices incorporating them.

An additional feature of the present invention is to provide an electrochemical capacitor electrode that can use the unique carbon black of the present invention and which can achieve a high packing density and high electrode density.

A further feature of the present invention is to provide an electrode that has low resistance (e.g., low ESR), in combination with acceptable volumetric and/or gravimetric capacitance.

An additional feature of the present invention is to provide an electrode that can exclusively have carbon black alone as the carbonaceous material, without the need for activated carbon.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a carbon black having a) a nitrogen BET surface area (BET) of from about 600 m$^2$/g to about 2100 m$^2$/g, b) a CDBP value in mL/100 g of from about (−2.8+(b*BET)) to about (108+(b*BET)), where b is 0.087 and BET is expressed in m$^2$/g, and c) an apparent density ($\rho$, g/cm$^3$) of at least about 0.820+ q*BET, where q=−2.5×10$^{-4}$, as determined at a compressive pressure (P) of 200 kgf/cm$^2$ on dry carbon black powder.

In addition, the present invention relates to energy storage devices containing one or more carbon blacks of the present invention. The energy storage device can be, for example, an Electrochemical Double Layer Capacitor (EDLC) or other electrochemical capacitor. These EDLC's can provide device characteristics that show low ESR and/or high volumetric and gravimetric capacitance of EDLC containing carbon black in comparison to EDLC containing activated carbon.

The present invention also relates in part to asymmetric- and pseudo-capacitive EDLC, and other energy storage devices, such as batteries and fuel cells including hybrid capacitor-battery designs, having at least one or part of an electrode that contains at least one carbon black of the present invention.

The electrodes of the present invention can be formed from one or more types of present carbon blacks, or in further combination with other carbon blacks such as conventional carbon products, such as graphite, graphene, nano-graphite, conventional carbon black outside the morphology space disclosed herein, vitreous carbon, activated charcoal, carbon fiber, carbon nanofiber, activated carbon, carbon aerogels, carbon nanotubes, carbon nanorods, and the like, in the form of a blend with present carbon black. In forming the electrode, typically, the carbon black can be combined, for example, with at least one binder.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIG. 4a is a graph showing cyclic voltametry scan (50 mV/s scan rate) for an example of the present carbon black (Carbon Black 2) with gravimetric capacitance (F/g) of the cell plotted versus E (V).

FIG. 4b is a graph showing impedance spectroscopy scan (50 mV amplitude, 0 V bias) for the same present carbon black as referenced in FIG. 4a, which shows equivalent series resistance (ESR) at various frequencies as obtained from impedance spectroscopy scan conducted on the present carbon black using a frequency response analysis (FRA) module.

FIG. 5 is a graph showing the behavior of capacitance (F/g) as a function of frequency (Hz) for several series of carbon blacks including the same present carbon black referenced in FIGS. 4a and 4b (Carbon Black 2—dashed line), and separately prior products (BP2000—solid line, RP20 activated carbon—crosses) for comparison.

DETAILED DESCRIPTION

Figure 1:
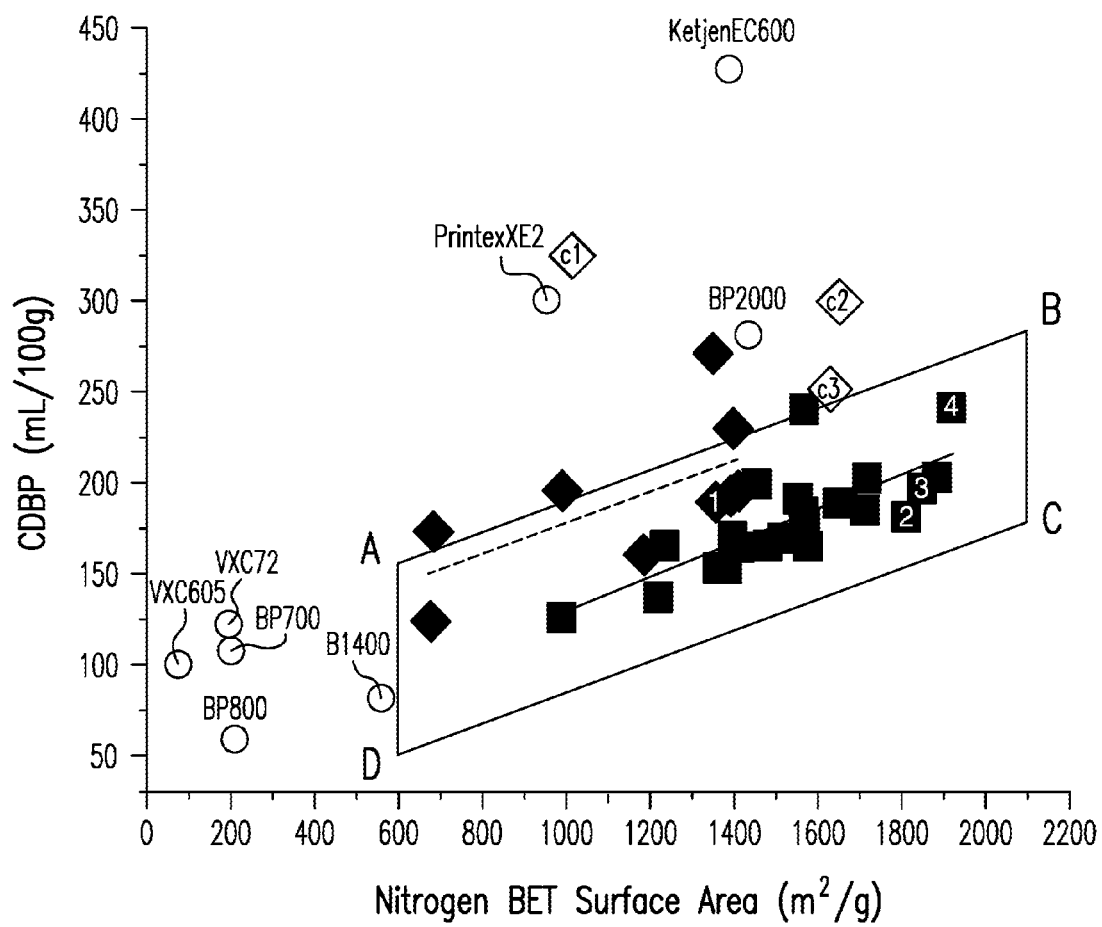
FIG. 1 is a graph showing CDBP (mL/100 g) and nitrogen BET surface area (m$^2$/g) values for examples of the present carbon blacks and comparison carbon blacks. Carbon blacks 1-4 of the Examples section are indicated along with comparative examples c1-c3 and several commercial products.

A unique carbon black having high surface area and simultaneously low structure (e.g., for better packing) is provided. These carbon black particles are desirable for use in energy storage applications, including EDLC applications and other energy storage devices. Previously, small, high surface area, and low structure particles with adequate chemical stability and conductivity that could be used in EDLC were not believed to be commercially available. The majority of previous EDLC have used activated carbon having relatively large particles (e.g., a mean particle size of around tens of microns) with a large particle size distribution (e.g., from about 0.1 to about 100 microns). Activated carbon particles with those features are inadequate for production of thin (<about 10 microns) electrodes. The present invention includes the feature of producing small, high surface area particles that have a low CDBP value, and which enable a tighter packing density in the electrode as well as enable thinner electrode constructions. This feature can enhance the use of the present carbon black in an EDLC and result in an EDLC having high volumetric capacitance and/or reduced ESR. Gain of both low ESR and the high volumetric capacitance from the same material has been achieved by utilization of the present carbon black. The use of the present carbon black also can boost the volumetric capacitance of the EDLC due to the higher surface area of the inventive carbon black compared to conventional conductive additives. Volumetric capacitance is defined as the electrical capacitance of material per unit mass, also known as gravimetric capacitance (a value in Farads per gram), multiplied by the electrode density (a value in grams per cubic centimeter). The volumetric capacitance in general increases with increasing surface area of the carbon material. The use of the present carbon black in an EDLC is believed to enable the boosting of the volumetric capacitance of the EDLC due to the higher surface area of the present carbon black in combination with its other features as compared to conventional conductive additives.

Accordingly, the present carbon blacks can solve prior problems or limitations in the performances of energy storage devices, as presently understood. The present carbon blacks can form at least a part of an electrode for an electrochemical capacitor or other energy storage device, which can have, for example, excellent volumetric capacitance and improved conductivity through the use of low-structure, and thus well-packed, high surface area carbon black particles of the present invention. As indicated, the present invention also relates to the use of one or more of the present carbon blacks in an EDLC or other supercapacitors. The present invention also relates to the use of the present carbon blacks in an EDLC or other supercapacitor used in hybrid types of energy storage devices. For example, carbon blacks of the present invention can be used as additives to a negative active mass of a lead acid battery (flooded or valve-regulated lead-acid type) in loadings, for example, of from about 0.5 wt. % to about 10 wt. % of the negative active mass composition. Other loading amounts outside of this range can be used. Operation of lead acid batteries in high-rate-partial-state-of-charge conditions can lead to severe limitations of the cycle life and dynamic charge acceptance of the batteries due to progressive accumulation of lead sulfate ($PbSO_4$) in the negative plate. Without desiring to be bound by any particular theory, it is believed that the addition of the present carbon blacks to a negative active mass formulation can increase the overall conductivity and porosity of the negative active mass, increase the acid accessible conductive area available for deposition of small lead sulfate crystallites, and improve the charge acceptance characteristics of the negative plate. Also, and without desiring to be bound by any particular theory, addition of the present carbon blacks to a negative active mass can minimize the undesired accumulation of $PbSO_4$ on the negative plate and lead to a significantly improved dynamic charge acceptance and an increased number of cycles that lead acid batteries can achieve at high-rate-partial-state-of-charge operating conditions. The present carbon blacks can be part of a porous body layer of an electrode or part thereof of the capacitor structure. The porous body layer can be referred to as an electrode membrane or simply as an electrode herein.

The present invention relates to a carbon black having a) a nitrogen BET surface area (BET) of from about 600 $m^2/g$ to about 2100 $m^2/g$, b) a CDBP value in mL/100 g of from about ($-2.8+(b*BET)$) to about ($108+(b*BET)$), where b is 0.087 and BET is expressed in $m^2/g$, and c) an apparent density ($\rho$, $g/cm^3$) of at least (or at least about) $0.820+q*BET$, where $q=-2.5\times10^{-4}$, as determined at a compressive pressure (P) of 200 $kgf/cm^2$ on dry carbon black powder.

The small, high surface area and low structure particles of the present carbon blacks can pack tightly, for example, when used in an EDLC electrode, have high surface area (e.g., ≥ about 600 $m^2/g$), and a low CDBP value (e.g., ≤ about 300 mL/100 g). The present carbon black morphology can comprise a CDBP-BET morphology space defined in a Cartesian (x-y) coordinate system, for example, as shown as parallelogram ABCD in FIG. 1. The nitrogen BET surface area (the graph abscissa) is measured according to ASTM Standard D6556. In FIG. 1, the CDBP value (the graph ordinate) is the dibutyl phthalate adsorption (DBPA) value for the carbon black determined after controlled compression, expressed as milliliters of DBPA per 100 grams compressed carbon black. The CDBP value is also known as crushed oil adsorption number (COAN). As used herein, except as otherwise noted, the CDBP value is based upon ASTM Standard D3493-06 in modified form. For purposes herein, the procedure of ASTM test method D3493-06 is used for CDBP measurements disclosed herein with the modifications that 15 g of carbon black is crushed in the compression cylinder described in the procedures of the test method, and 10 g out of these crushed 15 g is then tested in an absorptometer used to determine the oil absorption number according to procedures of the ASTM test method, after which the results are scaled to 100 g of material.

In FIG. 1, the solid and dashed lines represent the best linear fit to the experimental data (solid squares and solid diamonds, respectively). The empty circles and diamonds represent commercial grades of carbon black and carbon blacks based on U.S. Patent Application Publication No. 2009/0208751 A1, the entirety of which is incorporated herein by reference. The empty circles in FIG. 1 represent commercial carbon black materials that include: BP2000 carbon black (Cabot Corporation), PrintexXE2 (Degussa), KETJEN EC600 (Akzo Chemie), VXC72 Vulcan carbon black (Cabot Corporation), BP1400 (Cabot Corporation), BP700 (Cabot Corporation), BP800 (Cabot Corporation), and VXC605 (Cabot Corporation). These commercial carbon black materials as represented by circles in FIG. 1 were all analyzed for CDBP according to the unmodified ASTM test method for ASTM Standard D3493-06. The empty diamonds (c1, c2, and c3) represent comparative carbon blacks, such as made by methods disclosed in U.S. Patent Application Publication No. 2009/0208751 A1, where c1, c2, and c3 correspond to the examples 5, 2, and 3, respectively, of that publication. The materials displayed in FIG. 1 by the solid diamond symbols and solid square symbols represent examples of the present carbon blacks and are produced using the methodology and the reactor design as illustrated in the Examples section herein. The carbon blacks denoted as 1-4 in FIG. 1 correspond to Carbon Blacks 1-4 in the Example section herein. All carbon black within the region of parallelogram ABCD, including the parallelogram boundaries, can represent the present carbon blacks. The boundaries of parallelogram ABCD are described by the following equations:

AB: CDBP [mL/100 g]=108+$b$*BET [$m^2/g$],

BC: BET=2100 [$m^2/g$],

CD: CDBP [mL/100 g]=-2.8+$b$*BET [$m^2/g$],

DA: BET=600 [$m^2/g$], where the slope b=0.087. In these equations, the asterisk "*" represents a multiplier symbol equivalent to the mathematical symbol "x". This slope is selected because the two linear fits (dashed and solid lines) to the experimental data points (solid diamonds and solid squares) produce this same slope (see FIG. 1). The lines AB and DA are selected as they encompass the herein-described carbon blacks and do not encompass known commercial grades of carbon black or prior published carbon blacks (empty circles and empty diamonds, respectively). The line BC was chosen as such to provide a measurement tolerance in determining the nitrogen BET surface area and other measurement, which have uncertainties assumed to be approximately 5%. With respect to the line CD, it is within production designs and capabilities such as illustrated herein to produce a carbon black having a CDBP value down to about 32 [mL/100 g], or other values. Also, it is within production designs and capabilities such as illustrated herein to produce a commercial grade carbon black that has a primary particle size down to about 8 nm, or other values. A 8 nm particle diameter translates into the surface area BET=6/($\rho$*D)≈400 [m$^2$/g], where $\rho$=1.89 [g/cm$^3$] is the carbon black density and D=8 nm is the diameter of primaries. Drawing a line through the coordinate point (CDBP=32 [mL/100 g], BET=400 [m$^2$/g]) with a slope b=0.087 results in the line CD.

In addition to the space denoted as parallelogram ABCD in FIG. 1, further distinctions of the present carbon black materials from commercially known materials and the materials from the published art, such as U.S. Patent Application Publication No. 2009/0208751 A1, can be made. Although the CDBP measurement is an ASTM method, it may not be universally uniquely suited to characterize the structure of every type of carbon black. For example, some carbon blacks, such as those that are excessively etched in-reactor or during a post-processing step, may have a fragile structure that may fracture by following the CDBP test conditions (e.g., crushing pressure of 165 Mpa=24,000 psi=1682.5 kgf/cm$^2$). Therefore, the present carbon black materials also can be differentiated from previous carbon blacks by consideration of the apparent density of carbon blacks, p, at various compressive pressures, P, (see FIG. 2). In FIG. 2, the apparent densities of dry powders of the present carbon black and comparative carbon blacks at various pressures are shown. The determinations of the apparent density versus pressure for the carbon blacks of these experiments were performed on the DVVA4000 Dynamic Void Volume Analyzer (Micromeritics, Norcross, Ga., U.S.A.), which measures the void volume and calculates the apparent density of powdered materials as a function of pressure over the range from 10 to 2100 kgf/cm$^2$. For each measurement, 1 gram of powdered materials is used, which is dried prior to performing the test, and the density of carbon black is taken to be 1.9 g/cm$^3$ for the instrument to calculate the apparent density. The powdered material is dried with heating at 120° C. until the moisture content is 1 wt % or less, then it is stored in a dessicator until performing the test. For purposes herein, a "dry" carbon black or "dry" carbon black powder has been dried in accordance with this procedure.

Figure 2A:
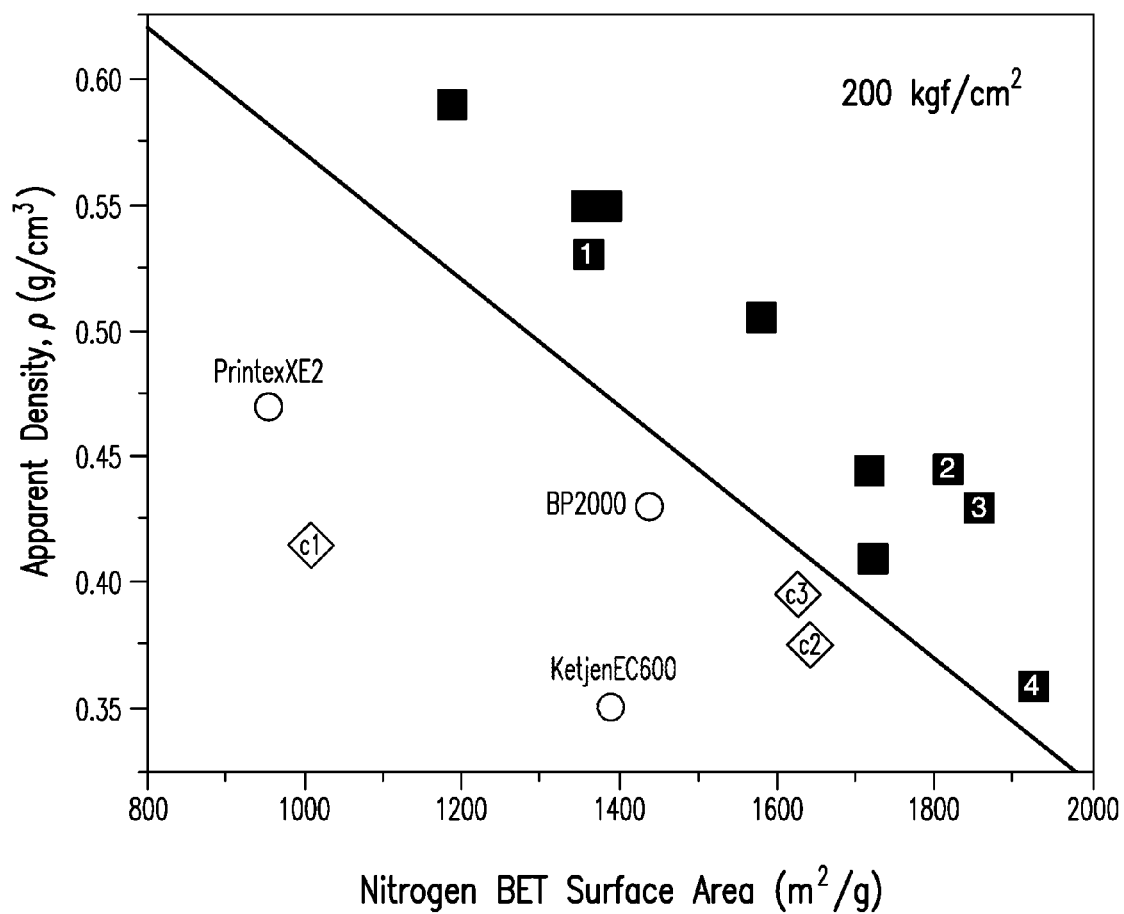
FIGS. 2a, 2b, and 2c show the apparent density ($\rho$, g/cm$^3$) as related to nitrogen BET surface area (m$^2$/g) for dry carbon black powder values for examples of the present carbon blacks and comparison carbon blacks at different compressive pressures of 200 kgf/cm$^2$, 500 kgf/cm$^2$, and 1000 kgf/cm$^2$, respectively. The carbon blacks 1-4 of the Examples section are indicated and the comparative carbon blacks are indicated as c1-c3.
Figure 2B:
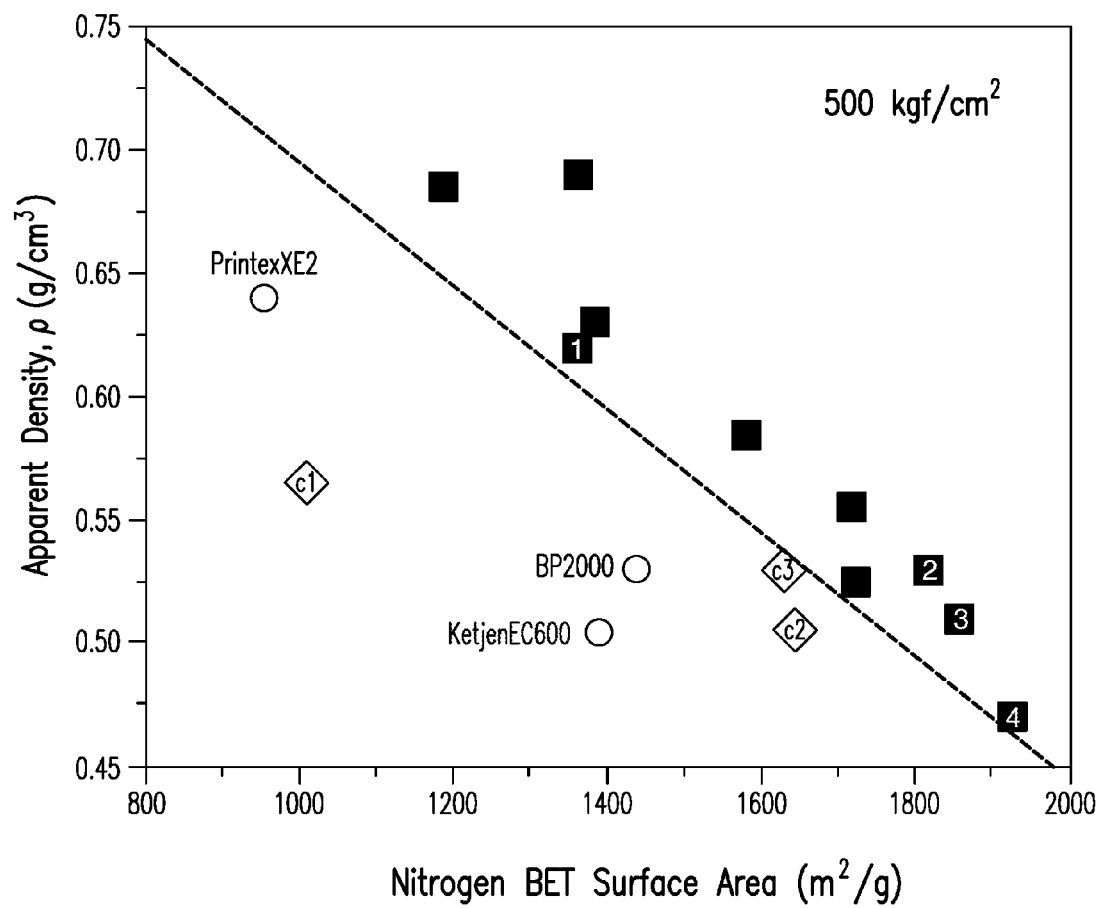
Figure 2C:
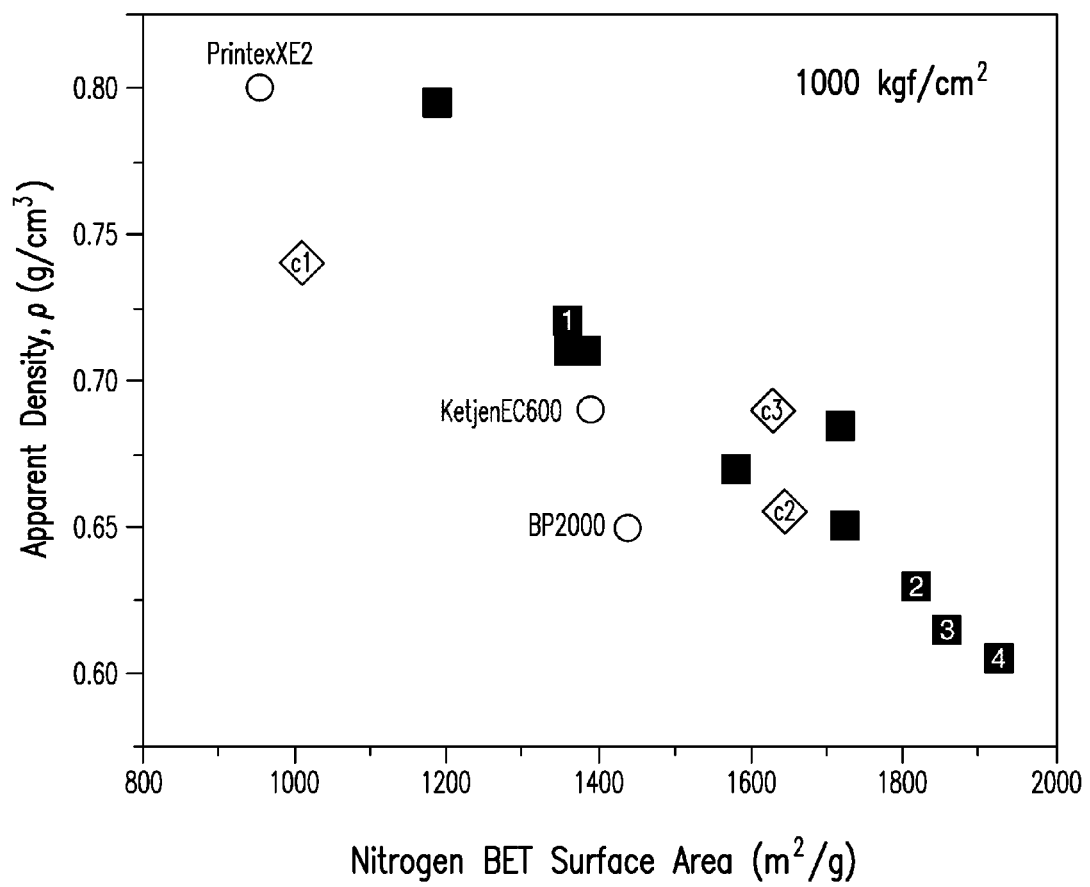

As shown in FIGS. 2a-2c, the present carbon blacks (solid symbols) display higher apparent density than the indicated commercial or prior publication carbon blacks (empty symbols) at pressures below 500 kgf/cm$^2$. Without desiring to be bound by any particular theory, it is believed that the commercial and indicated prior published carbon black, which have high structure, may undergo carbon black aggregate deformation and possible fracture at larger pressures. The results show that at the lower compressive pressures, such as for example 500 kgf/cm$^2$ and below, the present carbon blacks have higher apparent density than the commercial materials or materials disclosed in the indicated prior publication. In most electrode fabrications, relatively low compression pressure is exerted onto the electrode during fabrication, such as related in U.S. Patent Application Publication No. 2007/0148335 A1. It also is noted that the apparent density of compressed dry carbon black powder will tend to differ from the density of electrodes as a result of shearing forces used for electrode production, which results in better packing. The lines drawn in the FIGS. 2a and 2b are described by the following equations:

$$\rho[g/cm^3]=0.820+q*BET\ [m^2/g]\ (at\ P=200\ kgf/cm^2,\ solid\ line\ in\ FIG.\ 2a)$$

$$\rho[g/cm^3]=0.945+q*BET\ [m^2/g]\ (at\ P=500\ kgf/cm^2,\ dashed\ line\ in\ FIG.\ 2b)$$

where the slope q is equal to q=−0.00025 (or, −2.5×10$^{-4}$). Without being bound by any particular theory, at higher compression pressures, in addition to the possible breaking of carbon black aggregates, another mechanism involved with significantly increasing the apparent density could be the carbon black aggregate deformation, such as bending, which could be the reason for increased apparent density of the high structure commercial and steam-etched materials at pressures of 1000 kgf/cm$^2$ and above, as shown in FIG. 2c.

It is also believed that BP2000, such as indicated in FIGS. 2a)-2c), is reasonably representative of the upper BET/lower CDBP limit of commercially available materials. Without desiring to be bound by any particular theory, it is believed that as a consequence of the low packing density of commercial carbon black materials such as BP2000, the volumetric capacitance of these materials in an EDLC device is less than that of the carbon blacks provided herein.

The present carbon black can have a nitrogen BET surface area in the space denoted as parallelogram ABCD in FIG. 1, which can be, for example, from about 600 m$^2$/g to about 2100 m$^2$/g, or higher. The BET surface area can have or include, for example, one of the following ranges: from about 600 to about 2,100 m$^2$/g, or from about 650 to about 2,050 m$^2$/g, or from about 600 to about 2,000 m$^2$/g, or from about 650 to about 1,950 m$^2$/g, or from about 700 to about 1,900 m$^2$/g, or from about 750 to about 1,850 m$^2$/g, or from about 800 to about 1,800 m$^2$/g, or from about 850 to about 1,750 m$^2$/g, or from about 900 to about 1,700 m$^2$/g, about 950 to about 1,650 m$^2$/g; or about 1,000 to about 1,600 m$^2$/g, or from about 1,050 to about 1,550 m$^2$/g, or from about 1,100 to about 1,500 m$^2$/g, or from about 1,150 to about 1,450 m$^2$/g, or from about 1,200 to about 1,400 m$^2$/g, or from about 1,250 to about 1,350 m$^2$/g, or from about 1,275 to about 1,325 m$^2$/g, or about 1,275 to about 1,300 m$^2$/g. Other ranges within or outside of these ranges are possible.

The present carbon black can have a CDBP value in the space denoted as parallelogram ABCD in FIG. 1, which can be, for example, from about 50 to about 300 mL/100 g, or from about 60 to about 290 mL/100 g, or from about 70 to about 280 mL/100 g, or from about 80 to about 270 mL/100 g, or from about 90 to about 260 mL/100 g, or from about 100 to about 250 mL/100 g, or from about 110 to about 240 mL/100 g, or from about 120 to about 230 mL/100 g, or from about 130 to about 220 mL/100 g, or from about 140 to about 210 mL/100 g, or from about 150 to about 200 mL/100 g, or from about 160 to about 190 mL/100 g, or from about 170 to about 180 mL/100 g. Other ranges within or outside of these ranges are possible.

The present carbon black can have a combination of surface area and crushed DBP values in the space denoted as parallelogram ABCD in FIG. 1, which can be, for example, any combination of a BET surface area of from about 600 m$^2$/g to about 2,100 m$^2$/g and a CDBP value of from about 50 mL/100 g to about 300 mL/100 g, such as can be selected from any combination of the above-indicated BET and CDBP value ranges.

A simplified description of a carbon black particle is an aggregate of a number of particulates, which are referred to as the primary particles ("primaries"). The size of primaries in a carbon black particle can vary, but production of carbon black with primaries of size (diameter) down to at least about 8 nm is feasible, such as with, for example, the processes illustrated herein. The number of primaries in the aggregate can also vary, for example, from about one to about few tens or possibly hundreds, thus resulting in the carbon black particle size of up to about 500 nm. The mean particle size of the carbon black can be, for example, approximately 100 nm (0.1 micron). The number of primaries and the arrangement of them in the carbon black particle not only dictate the size of the carbon black particle but also the structure of the carbon black.

The average primary particle size is determined by ASTM D3849-04, the entirety of which is incorporated herein by reference, and can be, for example, less than about 100 nm, or less than about 75 nm, or less than about 50 nm, or less than about 30 nm, or less than about 20 nm, or less than about 10 nm. The carbon black aggregates can be, for example, assemblies of primary carbon black particles that are fused at the contact points and cannot readily be separated by shearing. The average aggregate size of the carbon black may be extracted from TEM image analysis using the imaging technique described in ASTM D3849-04, the entirety of which is incorporated herein by reference. The carbon black can have an average aggregate size that is, for example, less than about 500 nm, or less than about 400 nm, or less than about 300 nm, or less than about 200 nm, or less than about 100 nm.

In examples of average primary particle size and/or an average aggregate particle size that the present carbon black can have, but are not limited to, the carbon black can have one or more of the following properties:

a) an average primary particle size of from about 8 nm to about 100 nm, or from about 8 nm to about 50 nm, or from about 9 nm to about 40 nm, or from about 9 nm to about 30 nm, or from about 10 nm to about 20 nm, or from about 10 to about 15 nm;

b) an average aggregate particle size of from about 8 nm to about 500 nm, or from about 20 nm to about 400 nm, or from about 30 to about 300 nm, or from about 50 nm to about 250 nm, or from about 75 nm to about 200 nm, or from about 100 nm to about 175 nm, or from about 125 nm to about 150 nm, or from about 50 nm to about 70 nm, or from about 55 nm to about 65 nm, or from about 58 nm to about 62 nm. For example, the present carbon black can have an average size of primaries of from about 8 nm to about 100 nm, and an average size of carbon black particles of from about from about 8 nm to about 500 nm.

With respect to other properties that the present carbon blacks can have independent of a) and b), these properties include, but are not limited to, one or more of the following additional properties:

c) an Iodine number value (ASTM D1510) of from about 1000 to about 2200 mg/g, or from about 1200 to about 2000 mg/g, or from about 1500 to about 1900 mg/g, or from about 1690 to about 1710 mg/g, or from about 1695 to about 1700 mg/g;

d) a volatiles percent (ASTM D1620) of from 0 to about 4%, or from about 0.1% to about 3.5%, or from about 0.5% to about 3%, or from about 1% to about 2%;

e) an ash percent (ASTM D1506) of from 0 to about 3%, or from about 0.05% to about 2%, or from about 0.1% to about 1%, or from about 0.1% to about 0.5%, or from about 0.25% to about 0.4%;

f) a 325 mesh sieve residue (maximum)(ASTM D1514) of from about 5 to about 120 ppm, or from about 10 to about 50 ppm, or from about 15 to about 30 ppm, or from about 17 to about 22 ppm, or from about 18 to about 21 ppm, or from about 19 to about 20 ppm;

g) a sulfur content (ASTM D1619) of from 0 to about 0.2%, or from about 0.005% to about 0.1%, or from about 0.01% to about 0.5%, or from about 0.025% to about 0.25%, or from about 0.045% to about 0.05%; and h) a moisture percent (ASTM D1509) of from 0 to about 8%, or from about 0.1% to about 7%, or from about 0.5% to about 5%, or from about 1% to about 4%, or from about 1% to about 3%, or from about 1.5% to about 2.5%, or from about 1.8% to about 2%.

The present carbon black can have, for example, one or more of these properties a)-h). For instance, the carbon black of the present invention can have at least one, two, three, four, five, six, seven, or all eight of these properties. The carbon black can have any combination of the properties a)-h).

Figure 3:
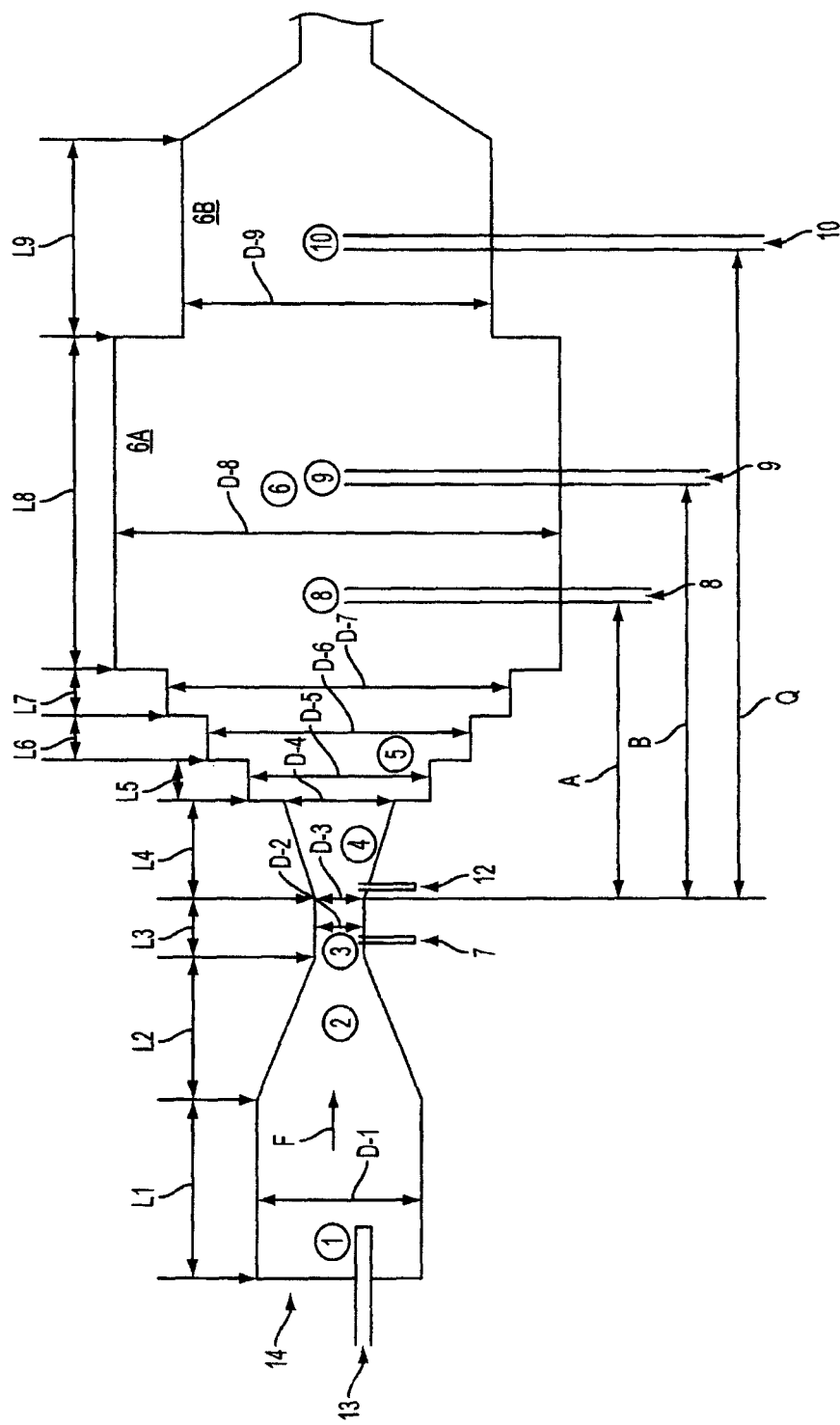
FIG. 3 is a schematic view of a portion of one type of carbon black reactor, which may be used to produce the present carbon blacks.

The present carbon blacks can be, for example, a furnace carbon black. FIG. 3 shows an illustrative portion of one type of carbon black reactor that can be used to produce carbon blacks of the present invention taking into account the process conditions described herein. Process conditions and reactor arrangements for production of the present high surface, low structure carbon blacks can include the following features.

In general, to make the unique present carbon black grades with higher surface area and lower structure, at least in terms of lower CDBP values, than previously available carbon black materials, one or more, such as all, of the following process conditions and equipment arrangements 1)-5) can be used, including:

1) introduction (e.g., injection) of large amounts of potassium or other Group IA elements or ions thereof of the Periodic Table (e.g., $Na/Na^+$, $K/K^+$, $Cs/Cs^+$)

2) adjustment of the reactor geometry at a location along the length of the reactor in the flow direction of the reaction stream, such as by tapering the reactor diameter to reduce recirculation, 3) use of low sulfur or sulfur-free feedstock.

4) addition of calcium in the reactor to etch the carbon black therein, 5) injection of water and oxygen downstream of the introduction point(s) of the carbon black yielding feedstock but upstream of the quench to increase temperature and provide a moist environment.

In one aspect, the present carbon blacks are produced, for example, in a furnace carbon black reactor, such as that depicted in FIG. 3, having a combustion zone 1, which has a zone of converging diameter 2, transition zone 3, conical entry section 4, stepped entry section 5, and reaction zone 6. The diameter of the combustion zone 1, up to the point where the zone of converging diameter 2 begins, is shown as D-1; the diameter of zone 3, as D-2; the entry and exit diameters of conical zone 4 as D-3 and D-4, respectively; the diameters of stepped entry zone 5 as D-5, D-6, D-7; and the diameters of reaction zone 6 as D-8 and D-9. The length of the combustion zone 1, up to the point where the zone of converging diameter 2 begins, is shown as L-1; the length of the zone of converging diameter is shown as L-2; the length of the transition zone is shown as L-3; the length of the conical section, zone 4, as L-4; and the lengths of the steps in the reactor entry section, zone 5, as L-5, L-6, and L-7. The lengths of the reaction zone 6 are L-8 and L-9.

To produce carbon blacks, hot combustion gases are generated in combustion zone 1, by contacting a liquid or gaseous fuel 13 with a suitable oxidant stream 14 such as air, oxygen, mixtures of air and oxygen or the like. When oxygen is added to the oxidant stream (herein referred to as "enrichment oxygen"), it is added so as to enrich the oxygen content of the air to levels from about 21 to about 35%. Among the fuels suitable for use in contacting the oxidant stream in combustion zone 1 to generate the hot combustion gases are any of the readily combustible gas, vapor, or liquid streams such as natural gas, hydrogen, carbon monoxide, methane, acetylene, alcohol, or kerosene. Generally, the fuels have a high content of carbon-containing components, in particular, hydrocarbons. As an example, the volumetric ratio of air to natural gas utilized to produce the carbon blacks of the present invention can be from about 5:1 to about 100:1. To facilitate the generation of hot combustion gases, the oxidant stream may be preheated.

The hot combustion gas stream flows downstream from zones 1 and 2 into zones 3, 4, 5, and 6. The direction of the flow of hot combustion gases is shown in FIG. 3 by the "F" arrow. Carbon black-yielding feedstock can be introduced at point 7 (located in zone 3). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

Without desiring to be bound by any particular theory, reductions in sulfur amounts are believed to depress the structure of the carbon black product, such as seen in lowered CDBP values as compared to a similarly made carbon black at higher sulfur amounts. Feedstocks with lower sulfur content can be used. Sulfur levels can be, for example, from 0 to about 5 wt %, or from 0 to about 1 wt %, or 0 to about 0.5 wt %, or from 0 to about 0.1 wt %, based on total carbon black yielding feedstock used in the entire process. These sulfur level ranges and amounts also can apply to any individual carbon black yielding feedstock stream.

Generally, carbon black-yielding feedstock is injected at point 7 in the form of a plurality of streams (not shown) which penetrate into the interior regions of the hot combustion gas stream to insure a high rate of mixing and shearing of the carbon black-yielding feedstock by the hot combustion gases so as to rapidly and completely decompose and convert the feedstock to carbon black.

The mixture of carbon black-yielding feedstock and hot combustion gases flows downstream through zone 3 into zones 4, 5, and 6. Water can be injected into zone 6 at point 8 in the reactor. Without being bound by any particular theory, this water can vaporize into steam, which increases the concentration of gaseous species that can oxidize carbon, resulting in an increased rate of oxidative attack of the carbon black surface. This can result in an etched or porous carbon black with higher surface area that provides the benefits described above. The weight ratio of the amount of injected water to the carbon black-yielding feedstock is typically from 0 to about 1:1, or from about 0.1:1 to about 1:1, or from about 0.2:1 to about 0.5:1, or from about 0.3:1 to about 0.7:1, or from about 0.4:1 to about 0.8:1 and the like. This water (herein referred to as "intermediate water") is differentiated from the quench water, located at point 10, whose purpose is to stop the reaction. In FIG. 3, "A" is the distance from the beginning of zone 4 to intermediate water point 8, and will vary according to the position of the intermediate water injection. Oxygen gas (herein referred to as "intermediate oxygen") can be added to zone 6 at point 9. Without being bound by any particular theory, the oxygen can react with combustible species like carbon monoxide and hydrogen in the gas to increase the temperature of the system, thereby increasing the rate of oxidative attack of the carbon black surface, resulting in etched or porous carbon black with higher surface area than carbon black untreated with oxygen gas, which provides the benefits described above. The molar ratio of intermediate oxygen to the amount of air that is added to Zone 1 can be from 0 to about 1:4, or from about 0.1:4 to about 1:4, or from about 0.2:4 to 0.9:4, or from about 0.3:4 to about 0.8:4 and the like. In FIG. 3, "B" is the distance from the beginning of zone 4 to intermediate oxygen point 9, and can vary according to the position of the intermediate oxygen injection. As an example, water and oxygen can be injected downstream of the carbon black-yielding feedstock introduction point and upstream of the quenching, effective to increase the temperature at least about 5%, or at least about 10%, or at least about 15%, or at least about 20%, and/or increase the moisture content at least about 5%, or at least about 10%, or at least about 15%, or at least about 20%, in the reactor relative to the temperature and the moisture content in the reactor without injecting the water and the oxygen and all other conditions the same.

Withot desiring to be bound by any particular theory, adjustment of the reactor geometry (diameter) at a location between the exit of the transition zone 3 and the reaction zone 6 by gentle expansion of the reactor geometry to reduce recirculation is believed to depress the structure of the carbon black product, such as seen in lowered CDBP values as compared to a similarly made carbon black in more sharply stepped reactor designs. One method of expanding the reaction zone gently is through the use of a conical zone. For example, in FIG. 3, transition zone 3 is followed by a conical zone 4 having initial diameter D-3 and final diameter D-4. As an example, dimensions D-3, D-4, and L4 of conical zone 4, such as shown in FIG. 3, can be related, for example, wherein (D-3/L4) can be from about 0.5 to about 0.8 (D-4/L4), or from about 0.6 to about 0.7 (D-4/L4). For example, as an illustration only, where D-3 is 0.15 m, D-4 is 0.23 m, and L4 is 0.46 m, then (D-3/L4) is 0.66 (D-4/L4).

Quench 11 of the reactor, located at point 10, injects a quenching fluid, which may be water, and is utilized to stop the further formation of carbon blacks. Point 10 may be determined in any manner known to the art for selecting the position of a quench to stop pyrolysis. In FIG. 3, "Q" is the distance from the beginning of zone 4 to quench point 10, and will vary according to the position of the quench. For these carbon blacks, as an example, Q can be maximized to maximize the available time for etching to create high surface area.

After the mixture of hot combustion gases and carbon black-yielding feedstock is quenched, the cooled gases pass downstream into any conventional cooling and separating apparatus whereby the carbon blacks are recovered. The separation of the carbon black from the gas stream is readily accomplished by a conventional apparatus such as a precipitator, cyclone separator or bag filter. This separation may be followed by pelletizing using, for example, a wet pelletizer.

Substances that contain at least one Group IA and at least one Group IIA element (or ion thereof) of the Periodic Table can be introduced into the reactor. Preferably, the substance contains at least one alkali metal and at least one alkaline earth metal. Examples of Group IA elements include lithium, sodium, potassium, rubidium, cesium, or francium, or any combination of two or more of these. Examples of Group IIA elements include calcium, barium, strontium, or radium, or any combination of two or more of these. The substances can be a solid, solution, dispersion, gas, or any combination thereof. More than one substance having the same or different Group IA or Group IIA element or ion can be used. For purposes of the present invention, the substances can be the metal (or metal ion) itself, a compound containing one or more of these elements, including a salt containing one or more of these elements, and the like. Exemplary Group IA metal salts include both organic and inorganic salts, for example, salts, e.g., of sodium and/or potassium, with any of chloride, acetate, or formate, or combinations of two or more such salts. Exemplary Group IIA metal salts include both organic and inorganic salts, for example, salts, e.g., of calcium, with any of chloride, acetate, or formate, or combinations of two or more such salts. The substances are capable, for example, of introducing a metal or metal ion into the reaction that is ongoing to form the carbon black product. The substances can be added together, separately, sequentially, or in different reaction locations. For instance, the substances can be added at any point prior to the complete quenching, including prior to the introduction of the carbon black yielding feedstock in zone 1 or 2 (of FIG. 3); during the introduction of the carbon black yielding feedstock in zone 3; after the introduction of the carbon black yielding feedstock in zones 4-10; or any step prior to complete quenching. More than one point of introduction of the substance can be used. The amount of the metal- or metal ion-containing substance can be any amount as long as a carbon black product can be formed. In certain preferred embodiments, the substances may introduce potassium or potassium ion in combination with calcium or calcium ion.

For example, the Group IA element or ion can be added in total amount from 0 to about 1 wt %, based on the total carbon yielding feedstock on a mass basis. The introduction of relatively large amounts of potassium or other Group IA elements or ions into the reaction is believed to depress the structure of the carbon black product, such as is seen in lowered CDBP values as compared to a similarly made carbon black without potassium introduction. Without being bound by any particular theory, the charge of the Group IA metal ions may provide a repulsive force between individual carbon black particles. This repulsive force may keep particles from aggregating, thus decreasing the overall structure of the carbon black, as reflected by the CDBP value. To effect a reduction in the CDBP value, the Group IA elements (e.g., potassium) and/or ions thereof can be added in an amount effective for that result, for example, in amounts of from about 0.01 wt % to about 1 wt %, or from about 0.05 wt % to about 1 wt %, or from about 0.1 wt % to about 1 wt %, or from about 0.2 wt % to about 1 wt %, or from about 0.5 wt % to about 1 wt %, or from about 0.05 wt % to about 0.5 wt %, or from about 0.05 wt % to about 0.15 wt %, or from about 0.05 wt % to about 0.25 wt %, or from about 0.05 wt % to about 0.5 wt %, based on the total carbon yielding feedstock used in the entire process.

For example, the Group IIA element or ions can be added in a total amount from 0 to about 1 wt % of the total carbon yielding feedstock on a mass basis. The introduction of relatively large amounts of calcium or other group IIA elements or ions is believed to effect etching of the carbon black in the reactor, resulting in a higher surface area compared to a similarly made carbon black without calcium introduction. Without being bound by any particular theory, the Group IIA metal ions may act in a catalytic manner to increase the rate of oxidative attack of the carbon black surface by the gas-phase species in the tail gas. These effects can result in an etched or porous carbon black with higher surface area that provides the benefits described above. To effect an increase in surface area, the Group IIA elements (e.g., calcium) and/or ions thereof can be added in an amount effective for that result, for example, in amounts of from about 0.01 wt % to about 1 wt %, or from about 0.05 wt % to about 1 wt %, or from about 0.1 wt % to about 1 wt %, or from about 0.2 wt % to about 1 wt %, or from about 0.5 wt % to about 1 wt %, or from about 0.05 wt % to about 0.5 wt %, or from about 0.05 wt % to about 0.15 wt %, or from about 0.05 wt % to about 0.25 wt %, or from about 0.05 wt % to about 0.5 wt %, of the total carbon yielding feedstock used in the entire process.

The substances introducing the Group IA element or ion with the Group IIA element or ion can be added in any fashion including any conventional means. In other words, the substances can be added in the same manner that a carbon black yielding feedstock is introduced. The substance can be added as a gas, liquid, or solid, or any combination thereof. The substances containing potassium/potassium ions and calcium/calcium ions can be added at one point or several points, such as illustrated as point 12 in FIG. 3, and can be added as a single stream or a plurality of streams. The substance also or alternatively can be mixed in with the feedstock, fuel, and/or oxidant prior to and/or during their introduction, such as, for example, one or more of feed streams 7, 13, and 14 shown in FIG. 3, or at other reactor locations. The potassium/potassium ions and calcium/calcium ions can be introduced at different points and/or through separate injectors in the reactor (not shown).

The substances can be added in an amount such that about 200 ppm or more of the Group IA element or ion and/or Group IIA element or ion is present in the carbon black product ultimately formed. Other amounts include from about 200 ppm to about 20000 ppm or more and other ranges can be from about 500 ppm to about 20000 ppm, or from about 1000 ppm to about 20000 ppm, or from about 5000 ppm to about 20000 ppm, or from about 10000 ppm to about 20000 ppm, or from about 300 ppm to about 5000 ppm, or from about 500 ppm to about 3000 ppm, or from about 750 ppm to about 1500 ppm, of the Group IA and/or Group IIA element or ion present in the carbon black product that is formed. These levels can be with respect to the metal ion concentration. These amounts of the Group IA and/or Group IIA element or ion present in the carbon black product that is formed can be with respect to one element or more than one Group IA and/or Group IIA element or ion and would be therefore a combined amount of the Group IA and/or Group IIA elements or ions present in the carbon black product that is formed. Therefore, these amounts can apply to Group IA element/ion or Group IIA element/ion content alone.

The present high surface area and low structure carbon black, which is useful for an EDLC or other energy storage device, can be prepared, for example, by simultaneously adjusting the burner natural gas rate, enrichment oxygen rate, feedstock rate, feedstock type, Group IA element concentration in the feedstock, Group IIA element concentration in the feedstock, intermediate water rate and location, and intermediate oxygen rate and location to achieve the desired properties. Selection of the particular reactor geometry described herein also can be significant in achieving the desired properties. The surface area of the carbon black can be increased, for example, by increasing the burner natural gas rate, increasing the enrichment oxygen rate, decreasing the feedstock rate, increasing the Group IIA element concentration, and/or increasing the intermediate water rate while simultaneously increasing the intermediate oxygen rate. The CDBP value can be decreased, for example, by decreasing the burner natural gas rate, decreasing the enrichment oxygen rate, decreasing the feedstock rate, increasing the Group IA element concentration, and/or decreasing the intermediate water rate while simultaneously decreasing the intermediate oxygen rate. The exact levels of each variable required to create carbon black with the desired properties can depend on the geometry of the reactor and the method of injection of each species into the reactor. Some examples are described in more detail below.

The present carbon black product can be in the form of a powder or finely divided form. The present carbon black also can be, for example, pelletized, agglomerated, or mixed with any other substance, such as particles, liquids, solids, polymers, or other materials. Catalyzed forms of the present carbon black also can be provided.

The carbon blacks of the present invention can be used, for example, in a capacitor, or an EDLC, or other energy storage device. The carbon black can be, for example, part of an electrode. The electrode can be in direct contact with a current collector, which generally is a metal (e.g., strip, rod, etc.), such as aluminum, aluminum with a thin conductive carbon coating, etched aluminum, and aluminum with a thin AlN coating, although other configurations also are contemplated.

The electrode can comprise the present carbon black and can be present alone or in combination with other carbon blacks that are within or outside one or more of the property specifications identified herein. The electrode can optionally further contain other materials, such as activated carbon (or other large porous particles), a polymer (such as a polymer binder, such as a fluorinated polymer, such as poly(vinylidene fluoride-co-chlorotrifluoroethylene) co-polymer or similar polymers). Larger porous particles are described as being larger than about 2 microns and having a porosity such that the surface area is greater than about 1100 $m^2/g$. The porous particles that can be contained in the electrode are not specifically limited and can have electronic conductivity contributing to electric charge and discharge. An example of the applicable porous particles is granular or fibrous activated carbon that has been subjected to activation treatment. This type of activated carbon includes phenol based and coconut-shell based activated carbon. When any activated carbon (or other porous particle other than the carbon black of the present invention) is used with the carbon black of the present invention in the porous body layer, any weight ratio of the carbon black to activated carbon can be used, such as, but not limited to, weight ratios of (carbon black:activated carbon) from about 99:1 to about 1:99; or from about 90:10 to about 10:90; or from about 90:5 to about 15:85; or from about 90:10 to about 20:80; or from about 85:10 to about 25:75; or from about 80:20 to about 30:70; or from about 75:25 to about 35:65; or from about 70:30 to about 40:60; or from about 65:35 to about 45:55; or from about 60:40 to about 50:50; and the like. As an option, for example, less than about 50 wt % of activated carbon is present in the electrode (e.g., less than about 40 wt %, or less than about 30 wt %, or less than about 20 wt %, or less than about 10 wt %, or less than about 5 wt %, or from about 0.5 wt % to about 5 wt %, of activated carbon is present).

Thus, with the present invention, an EDLC or other energy storage device comprises an electrode, wherein the electrode comprises the carbon black of the present invention. With the present invention and the fact that an electrode can optionally consist of the carbon black alone or optionally with a very little weight percent of activated carbon as indicated above, the electrode can have a thin thickness, which is quite advantageous for purposes of the size of the overall EDLC. For instance, the porous body layer can have a thickness of from about 10 microns or less, or from about 5 microns or less; or from about 50 nm to about 10 microns; or from about 100 nm to about 9 microns; or from about 110 nm to about 8 microns; or from about 120 nm to about 7 microns; or from about 130 nm to about 5 microns. Additionally, the electrode can be up to about 3 mm, or up to about 2 mm, thick. Carbon black has an additional advantage over activated carbon electrode applications where a continuous, open network can form due to the structure of the black. Due to this open framework, the ions can move to surfaces within the porous body layer much more quickly than if the porous body layer were comprised of only activated carbon where the ions would have to diffuse into the about 2 to about 20 micron sized activated carbon particles.

With the present invention, an EDLC optionally can have at least two electrodes, each of the electrodes being in contact or adjacent to a current collector, and each electrode being separated by a separator element. When there is more than one electrode, the electrodes can both contain a carbon black of the present invention or just one of the electrodes can contain a carbon black of the present invention. Further, each of the electrodes can contain the same or different carbon blacks of the present invention or each electrode can contain the same or different overall combinations of carbon black, polymer binder, optional activated carbon, or other ingredients.

The electrode in EDLC can have a gravimetric capacitance (in Farads/g), for example, of at least about 80, such as from about 80 to about 160 Farads/g, or from about 100 to about 140 Farads/g, as determined by cyclic voltammetry or constant current charge discharge. When translating to gravimetric capacitance of EDLC cell (two electrodes), the cell capacitance is obtained by dividing the electrode capacitance by four (e.g., $C_{cell}=\frac{1}{4} \cdot C_{electrode}$). This is also true for the volumetric capacitance. Therefore, the gravimetric capacitance of the cell can have values, of at least about 20 Farads/g, such as from about 20 to about 40 Farads/g or equivalently F/g.

As an option, the cell (two electrodes) can have a volumetric capacitance (in Farads/mL or, equivalently, Farads/cc, or equivalently Farads/$cm^3$) of at least about 10 F/mL, such as from about 10 to about 30 F/mL, such as from about 12 to about 20 F/mL, which is determined based on F/g and electrode density.

In the present invention, as an option, the electrode can have an electrode density of at least about 0.3 g/cc, such as, for example, from about 0.3 g/cc to about 0.9 g/cc, or from about 0.4 g/cc to about 0.8 g/cc., or from about 0.5 g/cc to about 0.7 g/cc.

In part, the present invention relates to capacitors, such as electrochemical capacitors, which can be solid state capacitors. The capacitors can have a plurality of electrodes and electrolyte layers. The capacitor can be, for example, a double-layer capacitor, or a pseudo-capacitor, which can have charged storage derived mainly from Faradic transfer parallel with a double layer. With each of these types of capacitors, the carbon black of the present invention can be a part of one or more electrodes.

With the present invention, as an example, the capacitor can have at least two electrodes, wherein at least one electrode has the carbon black of the present invention present and also at least one ionically conductive layer in contact with the electrode layers to serve as a separator and at least one electrolyte.

In the present invention, the carbon black is, for example, electrically conductive carbon black. Therefore, an electrode of the present invention has or can have electronic conductivity. The electrode is in contact with a current collector. The electrode can be formed by applying a liquor containing the carbon black of the present invention and, optionally, other conductive particles, and a binder, which is able to bind the particles with each other. The content of the binder in the electrode can be, for example, in the range of from about 0.5% by mass to about 15% by mass, or from about 1% by mass to about 15% by mass, or higher. Other amounts can be used, wherein this percent is based on the total weight of the porous body layer.

In an example, an EDLC electrode can comprise the present carbon black (one or more carbon blacks of the present invention can be present), which can be present alone or optionally in combination with other carbon black(s) that does not have one or more of the BET, CDBP, and apparent viscosity property specifications identified above. The EDLC electrode may further contain other materials, such as surface active additives, conductive additives, activated carbon or other large porous particles, and/or a polymer such as a polymer binder, such as a fluorinated polymer, such as poly(vinylidene fluoride-co-chlorotrifluoroethylene) co-polymer or similar polymers. Larger porous particles can be, for example, larger than 1 micron in particle size. An example of the applicable larger porous particles is granular or fibrous activated carbon. That type of activated carbon includes phenol based and coconut-shell based activated carbon. The carbon black can be in any weight ratio with respect to the other constituents that are included in the electrode.

The electrode density is defined as the mass of electrode divided by the volume of electrode. For this definition as throughout the text, it is noted that the electrode does not include the indicated current collector. The volume of electrode is defined as the thickness of electrode multiplied by the area of electrode. The electrode comprising the carbon black can have any thickness. Without desiring to be bound to any particular theory, an additional advantage of using solely the present carbon black or mixtures of carbon black with comparable size particles can be the ability of producing thinner electrodes, which would not be achievable with activated carbons due to their particle sizes distribution (e.g., from about 0.1 to about 100 microns). An electrode thickness of about 10 microns or less is readily achievable with use of the present carbon black. Electrodes of about 10 microns or less can be better suited for high power applications of the EDLC, such as can be seen from an energy versus power plot as shown in R. Kotz et al., Electrochimica Acta 45, 2483-2498 (2000).

Another benefit of the present carbon black in the EDLC is the following. Due to smaller lengths of pores inside the carbon black particles (e.g., as a result of the small primary sizes of the carbon black) in comparison to that of activated carbon, the electrolyte ions can access the surface of pores within the carbon black much more rapidly compared to the activated carbon.

Without desiring to be bound by any particular theory, it is believed that because of an improved ionic part of the ESR, the EDLC containing the carbon black can operate faster as compared with the EDLC of comparable electrode thickness that contains activated carbon. As shown in the Examples section herein, the comparison of a present carbon black to activated carbon (RP-20, Kuraray Chemicals) is shown in FIG. 5, which shows that the full capacitance of carbon black electrodes is available up to 1 Hz frequency in comparison with 0.1 Hz frequency in the case of activated carbon. FIG. 5 shows frequency dependence of gravimetric capacitance of Carbon Black 2 (dashed line), BP2000 (solid line), and RP20 activated carbon (crosses). The data for RP-20 was extracted from FIG. 8 of Janes et al., Carbon 45, 1226-1233 (2007). Data obtained for RP20 is equivalent to the published data on the material.

Additional information on the materials and constructions that can be used in the present capacitors and EDLC's include the following.

As indicated, as an option, an EDLC including the present carbon black can have at least two electrodes, wherein at least one electrode includes the carbon black of the present invention.

The EDLC can comprise a pair of polarized electrodes with surfaces confronting each other. The capacitor also includes a pair of electrically conductive layers which are formed respectively on the other surfaces of the electrode bodies of the polarized electrodes. The polarized electrodes may be housed in an annular gasket which is made of electrically nonconductive rubber or synthetic resin. The polarized electrodes are separated from one another by a separator disposed therebetween. The capacitor can further include a pair of current collectors disposed respectively on the outer surfaces of the electrically conductive layers on the polarized electrodes.

The current collector in EDLC, for example, can be, for example, a metal foil such as aluminum foil. The metallic foil can be prepared by etching or by rolling using conventional techniques to prepare current collectors. Other current collectors, for instance, a carbon sheet or composite, non-porous metal or conductive polymers, can be used. The current collector can also comprise a metal, such as aluminum, that is deposited onto a carbon sheet, such as an extruded carbon black sheet, by various kinds of physical or chemical vapor depositions, for instance thermal evaporation of aluminum onto a carbon sheet. The thickness of the collector can be generally any suitable thickness, such as from about 5 microns to about 100 microns, such as from about 10 microns to about 100 microns, such as from about 20 to about 50 microns, or from about 25 to about 40 microns, or other thickness values.

Any organic or aqueous electrolytes can be used with the present carbon black electrodes. For instance, such organic electrolyte salts as triethylmethyl ammonium tetrafluoroborate $(C_2H_5)_3CH_3NBF_4$, tetraethyl ammonium tetrafluoroborate $(C_2H_5)_4NBF_4$, often abbreviated as $TEMABF_4$ and $TEABF_4$ respectively, or other salts in a propylene carbonate (PC, 1,2-propanediol cyclic carbonate), solvent, which has molecular formula $C_4H_6O_3$, or an acetonitrile (AN) solvent, which has molecular formula $CH_3CN$, or any other appropriate solvents can be used as organic electrolyte. Aqueous electrolytes can be for example $H_2SO_4$, KOH or other chemical solutions. The electrolyte can have any appropriate molarity.

A separator, such as a conventional separator, can also be used, for example, to separate two electrodes from each other. Examples of separators include, but are not limited to, porous paper, porous polyolefin films (e.g., porous polyethylene films, porous polypropylene films), porous fabrics, and the like. In an EDLC, a separator layer can have, for example, a thickness in the range of about 12.7 µm to about 254 µm, or other thickness values.

The capacitor can also have a bi-polar design.

The capacitors and components thereof that are described in U.S. Pat. Nos. 5,115,378; 5,581,438; 5,811,204; 5,585,999; and 5,260,855, which are incorporated in their entireties herein by reference, can be used in the present invention with the carbon black of the present invention. These patents generally describe conventional components, which can be used in the present invention with respect to electrolytes, containers to contain the capacitor, current collectors, and general structures of the electrodes and overall capacitor designs.

Any binder that is capable of binding the carbon black (and optionally other particles) with each other is appropriate for use in the electrode. Examples of binders include, but are not limited to, poly-tetrafluoroethylene (PTFE), polyvinylidenefluoride (PVDF), polyethylene (PE), polypropylene (PP), fluororubber, and the like. Examples of fluororubbers include, but are not limited to, fluororubber are vinylidenefluoride-hexafluoropropylene-based fluororubber (VDF-HFP-based fluororubber), vinylidenefluoride-hexafluoropropylene-tetrafluoroethylene-based fluororubber (VDF-HFP-TFE-based fluororubber), vinylidenefluoride-pentafluoropropylene-based fluororubber (VDF-PFP-based fluororubber), vinylidenefluoride-pentafluoropropylene-tetrafluoroethylene-based fluororubber (VDF-PFP-TFE-based fluororubber), vinylidenefluoride-perfluoromethylvinylether-tetrafluoroethylene-based fluororubber (VDF-PFMVE-TFE-based fluororubber), vinylidenefluoride-chlorotrifluoroethylene-based fluororubber (VDF-CTFE-based fluororubber). Among them, a fluororubber prepared by copolymerization of at least two kinds selected from VDF, HFP and TFE can be used, and a VDF-HFP-TFE-based fluororubber prepared by copolymerization of the above three kinds can be used.

The present invention accordingly, as an option, provides an electrode for an EDLC which can have an overall improved electrical conductivity compared to earlier devices. The electrode has more electrical contacts with the current collector by virtue of the small, high surface area carbon black particles. Further, the small, high surface area carbon black particles can pack together such that the apparent density is either only slightly affected in a negative fashion (e.g., about 10% or less decrease), not affected, or enhanced. Thus, the small, high surface area carbon black particles that pack in a tight fashion replace the conductive additive in earlier inventions in that this material is now the small particle that fills the inter-particle voids of the larger porous particles, but the small, high surface area carbon black particles have the additional advantage that the packing density is increased such that the highly conductive, small, high surface area carbon black particles will not decrease the volumetric capacitance of the as made electrode.

If increased dispersability of the carbon black with a binder is desirable, the carbon black can have one or more chemical groups, such as organic groups attached to its surface (e.g., chemically attached, adsorbed, coated, or otherwise present). For example, the carbon black can have attached at least one organic group comprising an aromatic group and/or an alkyl group. The aromatic group or alkyl group can be directly attached to the carbon black (e.g., a carbon atom of the aromatic or alkyl group is attached (e.g., bonded) to the carbon black). Moreover, and although typically not preferred for a symmetric EDLC, the chemical groups on carbon black surface can allow the carbon black to be used in other configurations, such as for pseudo-capacitors. For instance, a fluoro group or fluoro-containing organic group can be attached to the carbon black, for instance, as described in U.S. Pat. No. 6,522,522. The chemical groups, as well as methods to attach these groups to the conventional carbon black, are described in the following U.S. patents and publications, which are all incorporated in their entirety by reference herein: U.S. Pat. Nos. 5,851,280; 5,837,045; 5,803,959; 5,672,198; 5,571,311; 5,630,868; 5,707,432; 5,554,739; 5,689,016; 5,713,988; WO 96/18688; WO 97/47697; and WO 97/47699. The organic groups, which can be attached onto the carbon black, can be electron donor and/or electron acceptor groups. Alternatively, the organic groups, which can be attached onto the carbon black can include electron donor and/or electron acceptor groups. Yet another possibility is that electron donor and/or electron acceptor groups can be associated with the carbon black surface as counter ions. The organic groups that are attached onto carbon black could be simple small molecules, oligomers, or polymers. Examples of such electron donor and acceptor groups include, but are not limited to, substituted or un-substituted quinones; organometallic groups, such as substituted or un-substituted metallocenes (e.g., ferrocenes); substituted or un-substituted thiophenes/furans/pyrroles/carbazoles; substituted or un-substituted tetrathiafulvalene; and/or substituted or unsubstituted aromatic amines, for example, tri-phenylamines. Examples of polymeric electron donor and acceptor groups include, but not limited to, polythiophenes, polyacetylenes, polyphenylenevinylenes, polyanilines, and poly vinylcarbazoles.

The organic groups which can be attached onto the carbon black can be at least one or more ionic or ionizable groups or both. Ionic or ionizable functional groups forming anions or anionic groups include, for example, acidic groups or salts of acidic groups. Examples of organic groups that are anionic in nature include, but are not limited to, $-C_6H_4-COO^-X^+$; $-C_6H_4-SO_3^-X^+$; $-C_6H_4-(PO_3)^{2-}2X^+$; $-C_6H_2-(COO^-X^+)_3$; $-C_6H_3-(COO^-X^+)_2$; $-(CH_2)_2-(COO^-X^+)$; $-C_6H_4-(CH_2)_2-(COO^-X^+)$, wherein $X^+$ is any cation such as $Na^+$, $H^+$, $K^+$, $NH_4^+$, $Li^+$, $Ca^{2+}$, $Mg^{2+}$ and the like. As recognized by those skilled in the art, $X^+$ may be formed in-situ as part of the manufacturing process or may be associated with the aromatic or alkyl group through a typical salt swap or ion-exchange process. Amine represents examples of ionizable functional groups that form cations or cationic groups. Quaternary ammonium groups, quaternary phosphonium groups and sulfonium groups also represent examples of cationic group. Examples of organic groups that are cationic in nature include, but are not limited to, $-C_6H_4N(CH_3)_3^+Y^-$, $-C_6H_4COCH_2N(CH_3)_3^+Y^-$, $-C_6H_4(NC_5H_5)^+Y^-$, $-(C_5H_4N)C_2H_5^+Y^-$, $-(C_3H_5N_2)^+Y^-$ (imidazoles), $-(C_7H_7N_2)^+Y^-$ (indazoles), $-C_6H_4COCH_2(NC_5H_5)^+Y^-$, $-(C_5H_4N)CH_3^+Y^-$, and $-C_6H_4CH_2N(CH_3)_3^+Y^-$, wherein $Y^-$ is any halide or an anion such as $RSO_3^-$, $SO_4^{2-}$, $PO_4^{3-}$, $NO_3^-$, $OH_3^-$, $CH_3COO^-$ and the like; or combinations thereof, wherein R is an alkyl or aromatic group. As recognized by those skilled in the art, $Y^-$ may be formed in-situ as part of the manufacturing process or may be associated with the aromatic or alkyl group through a typical salt swap or ion-exchange process.

Any physically allowable treatment level of chemical groups (e.g., organic groups) with the carbon black is generally permitted. The treatment level of chemical groups with the carbon black, which may be expressed in terms of $\mu mol/m^2$ of carbon, of the chemical group (e.g., organic group) on the carbon black can be, for example, from about 0.1 to about 10 $\mu mol/m^2$ or more.

The carbon black in the present electrodes can have one type of chemical group (e.g., organic group) attached or more than one type of chemical group attached to its surface. In other words, dual or multi-treated modified carbon black can be used. Also, a mixture of modified carbon blacks having different chemical groups attached can be used.

The present carbon blacks can be post-processed after exiting the reactor such as shown in FIG. 3, by, for example, water- or acid-washing, heat-treatment, and/or chemical molecular treatment, and so forth, as long as they remain within the morphological space of parallelogram ABCD in FIG. 1, and although the relative position of the carbon black within the ABCD space may change. For example, the present carbon black can be post-processed to remove impurities, such as certain minerals and hydro-carbon surface molecules, or to graphitize the carbon black to a certain extent. Further, as long as the post-processing does not remove the carbon black from the ABCD space of FIG. 1, which is denoted by the parallelogram ABCD, and/or the apparent density space at or above the lines drawn in FIGS. 2a and 2b, that kind of post-processing can be used and the resulting post-processed carbon black product is a present carbon black. The post-processing also can possibly change the relative position of the carbon black grade that is subjected to post-processing within the parallelogram ABCD space in FIG. 1 and/or above the line defined by the above-indicated equation for FIG. 2a. The post processing can be a simple water (hot or cold) or acid washing procedure or a heat treatment. The temperatures of heat treatment can be such that may result in some graphitization of carbon black. With any graphitization, the carbon black should remain in the parallelogram ABCD. Alternatively, the temperatures can be such that they do not result in any additional graphitization, as, for example, below about 1100° C., such as related in D. H. Everett, et al., J. Chem. Soc., Faraday Trans. I, 82, 2915-2928 (1986). The heat treatment can be done, for example, in an inert atmosphere, such as argon or nitrogen.

The electrode containing the carbon black and optionally other components can be formed, for example, by coating the current collector with a liquid dispersion containing these components as a dispersion formulation. Exemplary liquids include, but are not limited to, organic-based solvents, such as ketone-based solvents like methylethyl ketone or methylisobutyl ketone, and aqueous solvents. Other examples are water and N-methyl pyrollidone (NMP).

Generally, any dispersion formulations, containing a present carbon black, and dispersion preparation and processing, can be used as part of the electrode fabrication. The dispersion formulation can comprise several components: carbon black, binders, dispersing agents, rheology modifiers, solvents, etc. This dispersion formulation can be, for example, in slurry form. The temperature can be controlled during dispersion mixing to from 15 to 45° C. or other ranges. The mixing can be performed via a high shear process, etc., where the mixing device can be a rotor stator, horizontal mill, sonic horn, sonic bath, cowls blade, and the like. Any viscosity of the dispersion can be achieved by choosing the appropriate mass content of particle in the dispersion, and this viscosity is chosen based on the application method of the dispersion. Examples of the coating method include, for example, an extrusion-lamination method, doctor-blade method, gravure-coat method, reverse-coat method, applicator-coat method, and screen-printing method.

Figure 8:
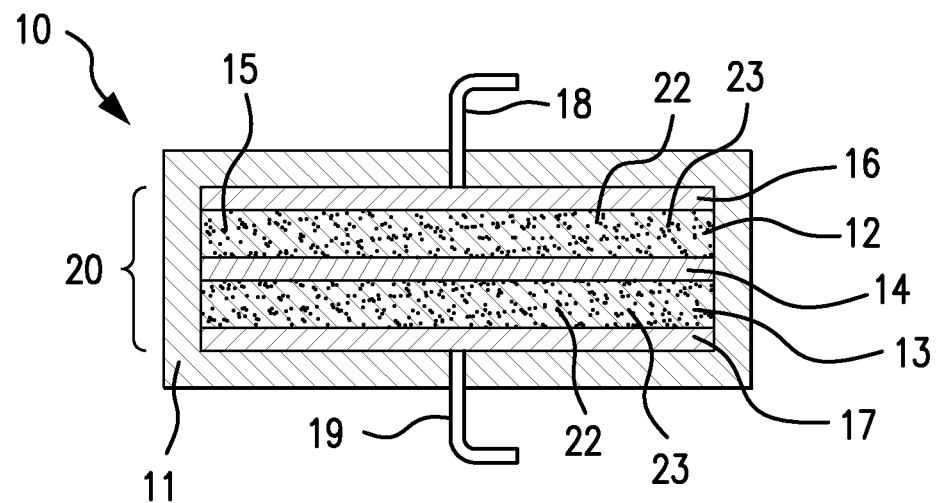
FIG. 8 is cross-sectional view of an EDLC that comprises a carbon black.

Referring to FIG. 8, an EDLC 10 is shown that includes a present carbon black. EDLC 10 has nonconductive enclosing body 11, a pair of carbon electrodes 12 and 13, an electronic porous separator layer 14, an electrolyte 15, a pair of conductive layers which are current collectors 16 and 17 and electrical leads 18 and 19, extending from the current collectors 16 and 17. One of the pair of current collectors 16 and 17 is attached to the back of each electrode 12 and 13. Electrodes 12 and 13 can each represent a plurality of electrodes so long as the electrodes are porous to electrolyte flow. Electrodes 12 and 13 can be, for example, carbon powder electrodes, activated carbon powder electrodes, or combinations of both, which comprise a present carbon black. The electrodes 12 and 13 can comprise a matrix including polymeric binder 22 and carbon powder 23, which are indicated for illustration only here and are not drawn to scale in this figure. As indicated, the electrode can be formed, for example, from a dispersion formulation comprising polymer binder, the carbon black, and solvent, which can be applied in slurry form on the current collectors. As indicated, the current collectors 16 and 17 can be, for example, thin layers of aluminum foil, or other suitable conductive materials. The electronic separator 14 is placed between the opposing carbon electrodes 13 and 14. The electronic separator 14 can be, for example, made from a porous material that acts as an electronic insulator between the carbon electrodes 12 and 13. The separator 14 keeps the opposing electrodes 12 and 13 out of contact with one another. Contact between the electrodes could result in a short circuit and rapid depletion of the charges stored in the electrodes. The porous nature of the separator 14 allows movement of ions in the electrolyte 15. In those embodiments in which the separator layers can be in contact with sealant material, they can have a porosity sufficient to permit the passage of sealant and can be resistant to the chemical components in the sealant. The enclosing body 11 can be, for example, any known enclosure means commonly used with or suitable for EDLC's. EDLC 10 of FIG. 8 can have a bipolar double layer cell 20 comprising the indicated features. EDLC cells comprising the present carbon blacks can be stacked in series (not shown), such as in conventional arrangements useful for this purpose. One or more EDLC cells comprising the present carbon blacks also can be used in combination with cells containing different carbon blacks or other conductive powders or materials.

The various EDLC designs and materials set forth in U.S. Patent Application Publication Nos. 2002/0012224 and 2004/0085709, and U.S. Pat. Nos. 5,646,815, 6,804,108, and 7,236,349, can be used, for example, with the present carbon black, and these patents (and all other patents mentioned herein) and patent publication (and all other publications mentioned herein) are incorporated in their entireties by reference herein.

Figure 9:
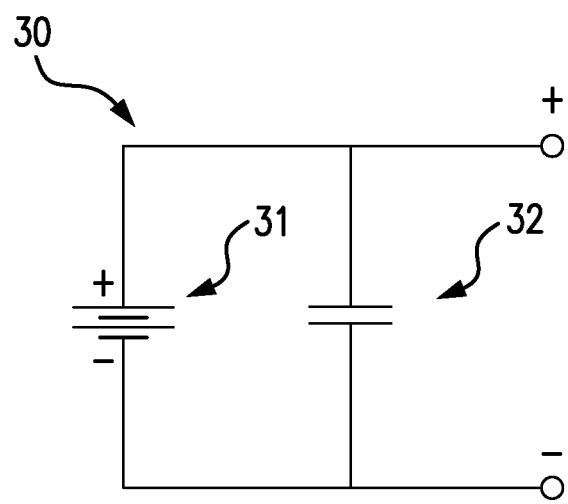
FIG. 9 shows an energy storage device comprising a lead-acid battery and an EDLC that comprises a carbon black.

The present carbon blacks also can be used in other various energy storage devices, including, for example, the use as a conductive additive to electrodes in batteries, as a catalyst support in fuel cells, and the use in hybrid energy storage devices, which are devices (also known as asymmetric supercapacitors or hybrid battery/supercapacitors) that combine battery electrodes and EDLC electrodes in one cell. For instance, the hybrid lead-carbon energy storage devices employ lead-acid battery positive electrodes and supercapacitor negative electrodes as described in, for example, U.S. Pat. Nos. 6,466,429; 6,628,504; 6,706,079; 7,006,346; and 7,110,242. Moreover, the EDLC can be used to supplement a battery to improve the battery cycle life by using the EDLC as a power responsive component (see FIG. 9). FIG. 9 shows a device 30 comprising a lead-acid battery 31 and an EDLC 32 with a present carbon black in a parallel architecture. The EDLC 32 can be operably connected with an independent power processor (not shown). Such a configuration or present EDLC alone may be used, for example, as a power source to start internal combustion engines, an auxiliary actuation device in hybrid vehicles, a power supply for stationary and mobile means of communications, a power supply of electric vehicles, a power supply of electronic equipment, and the like. A present device, or present EDLC alone, may be used, for example, as an energy storage and power device in laptop computers, netbooks, mobile phones, cellular phones, internet-browsable phones, internet phones, personal digital assistant devices (PDA's), (palm-size) portable digital media player and hard drive devices, digital cameras, digital video cameras (camcorders), or the like and any combinations thereof.

The present invention includes the following aspects/embodiments/features in any order and/or in any combination:

1. The present invention relates to an energy storage device comprising an electrode or a part thereof, wherein said electrode comprises carbon black having:
   a) a nitrogen BET surface area (BET) of from about 600 $m^2/g$ to about 2100 $m^2/g$;
   b) a CDBP value in mL/100 g of from about $(-2.8+(b*BET))$ to about $(108+(b*BET))$, where b is 0.087 and BET is expressed in $m^2/g$; and c) an apparent density ($\rho$, g/cm$^3$) of at least about 0.820+ q*BET, where q=$-2.5\times10^{-4}$, as determined at a compressive force (P) of 200 kgf/cm$^2$ on dry carbon black powder.

2. The energy storage device of any preceding or following embodiment/feature/aspect, wherein said carbon black having:
   a) an average size of primaries of from about 8 to about 100 nm; and
   b) an average size of carbon black particles of from about 8 to about 500 nm.

3. The energy storage device of any preceding or following embodiment/feature/aspect, wherein said electrode has a thickness of from about 50 microns or less.

4. The energy storage device of any preceding or following embodiment/feature/aspect, wherein said electrode has a thickness of from about 10 microns or less.

5. The energy storage device of any preceding or following embodiment/feature/aspect, wherein said electrode further comprises a second carbon black, which is different from said carbon black.

6. The energy storage device of any preceding or following embodiment/feature/aspect, comprising an electrochemical double layer capacitor (EDLC) comprising first and second electrodes each comprising said carbon black, which said carbon black is the same or different from each other, and a cell comprising said first and second electrodes, wherein said EDLC having a gravimetric capacitance of at least about 80 Farads/g for an electrode thereof and at least about 20 Farads/g for said cell.

7. The energy storage device of any preceding or following embodiment/feature/aspect, comprising an EDLC cell having at least about 10 F/mL capacitance.

8. The energy storage device of any preceding or following embodiment/feature/aspect, wherein said electrode has an electrode density of from about 0.30 g/cc to about 0.90 g/cc.

9. The energy storage device of any preceding or following embodiment/feature/aspect, wherein said carbon black having a CDBP value of from about 50 mL/100 g to about 300 mL/100 g.

10. The energy storage device of any preceding or following embodiment/feature/aspect, wherein said carbon black further has one or more of the following properties:
    a) an average primary particle size of from about 8 nm to about 100 nm;
    b) an average aggregate particle size of from about 8 nm to about 500 nm;
    c) an Iodine number value of from about 1000 mg/g to about 2200 mg/g;
    d) a volatiles percent of from 0 to about 4%;
    e) an ash percent of from 0 to about 3%;
    f) a 325 mesh sieve residue (maximum) of from about 5 ppm to about 120 ppm;
    g) a sulfur content of from 0 to about 0.2%; and
    h) a moisture percent of from 0 to about 8%.

11. The energy storage device of any preceding or following embodiment/feature/aspect, wherein said carbon black has at least four of said properties a)-h).

12. The energy storage device of any preceding or following embodiment/feature/aspect, wherein said carbon black has attached at least one organic group.

13. The energy storage device of any preceding or following embodiment/feature/aspect, wherein said carbon black has attached at least one organic group comprising an aromatic group or an alkyl group, wherein said aromatic group or alkyl group is directly attached to said carbon black.

14. The energy storage device of any preceding or following embodiment/feature/aspect, wherein said carbon black has attached at least one organic group that comprises an electron donor group, an electron acceptor group, or both.

15. The energy storage device of any preceding or following embodiment/feature/aspect, wherein the energy storage device is an electrochemical double layer capacitor (EDLC).

16. The energy storage device of any preceding or following embodiment/feature/aspect, wherein the energy storage device is a battery or fuel cell.

17. The energy storage device of any preceding or following embodiment/feature/aspect, wherein the energy storage device is a pseudocapacitor or asymmetric electrochemical capacitor.

18. The energy storage device of any preceding or following embodiment/feature/aspect, wherein the energy storage device is a hybrid of battery and electrochemical capacitor.

19. A carbon black having:
    a) a nitrogen BET surface area (BET) of about 600 m$^2$/g to about 2100 m$^2$/g;
    b) a CDBP value in mL/100 g of from about ($-2.8$+(b*BET)) to about (108+(b*BET)), where b is 0.087 and BET is expressed in m$^2$/g; and
    c) an apparent density ($\rho$, g/cm$^3$) of at least 0.820+q*BET, where q=$-2.5\times10^{-4}$, as determined at a compressive force (P) of 200 kgf/cm$^2$ on dry carbon black powder.

20. The carbon black of any preceding or following embodiment/feature/aspect, having
    a) an average size of primaries of from about 8 to about 100 nm; and
    b) an average size of carbon black particles of from about 8 to about 500 nm.

21. The carbon black of any preceding or following embodiment/feature/aspect, having a CDBP value of from about 50 mL/100 g to about 300 mL/100 g.

22. The carbon black of any preceding or following embodiment/feature/aspect, further having one or more of the following properties:
    a) an average primary particle size of from about 8 nm to about 100 nm;
    b) an average aggregate particle size of from about 8 nm to about 500 nm;
    c) an Iodine number value of from about 1000 mg/g to about 2200 mg/g;
    d) a volatiles percent of from 0 to about 4%;
    e) an ash percent of from 0 to about 3%;
    f) a 325 mesh sieve residue (maximum) of from about 5 ppm to about 120 ppm;
    g) a sulfur content of from 0 to about 0.2%; and
    h) a moisture percent of from 0 to about 8%.

23. The carbon black of any preceding or following embodiment/feature/aspect, having at least four of said properties a)-h).

24. The carbon black of any preceding or following embodiment/feature/aspect, having attached at least one organic group.

25. The carbon black of any preceding or following embodiment/feature/aspect, having attached at least one organic group comprising an aromatic group or an alkyl group, wherein said aromatic group or alkyl group is directly attached to said carbon black.

26. The carbon black of any preceding or following embodiment/feature/aspect, having attached at least one organic group comprising an electron donor group, an electron acceptor group, or both.

27. A method of making carbon black, comprising:
introducing to a reactor a carbon black yielding feedstock at an introduction point and a stream of hot gases to provide a reaction stream,
quenching the reaction stream to form a carbon black product, and
injecting water and oxygen downstream of the carbon black yielding feedstock introduction point and upstream of said quenching, effective to increase temperature and provide a moist environment in the reactor, wherein said carbon black product has:
  a) a nitrogen BET surface area (BET) of about 600 m²/g to about 2100 m²/g;
  b) a CDBP value in mL/100 g of from about (−2.8 +(b*BET)) to about (108+(b*BET)), where b is 0.087 and BET is expressed in m²/g; and
  c) an apparent density (ρ, g/cm³) of at least 0.820+ q*BET, where q=−2.5×10⁻⁴, as determined at a compressive force (P) of 200 kgf/cm² on dry carbon black powder.

28. The method of any preceding or following embodiment/feature/aspect, further comprising the addition of at least one Group IA element or ion, at least one Group IIA element or ion, or both, in the reactor in sufficient amount to etch the carbon black in the reactor before said quenching.

29. A method of making an energy storage device comprising forming an electrode or a part thereof comprising the carbon black of any preceding or following embodiment/feature/aspect.

30. A method of making an energy storage device of any preceding or following embodiment/feature/aspect, wherein said energy storage device is an EDLC.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be only exemplary of the present invention. Unless indicated otherwise, all amounts, percentages, ratios and the like used herein are by weight.

EXAMPLES

Example 1

Preparation of Carbon Black

Four examples of carbon blacks were prepared in a reactor as described above and shown in FIG. 3, utilizing a liquid feedstock having properties set forth in Table 1 and reactor conditions and geometry set forth in Table 2. Natural gas was employed as the fuel for the combustion reaction. An aqueous solution of potassium acetate was used as the Group IA metal-containing material, and was mixed with a liquid feedstock prior to injection into the reactor in zone 3 (with reference made to FIG. 3). An aqueous solution of calcium acetate was used as the Group IIA metal-containing material, and was also mixed with the liquid feedstock prior to injection into the reactor in zone 3 (with reference made to FIG. 3). The reaction was quenched with water purified by reverse osmosis.

TABLE 1

Feedstock Properties

| Feedstock Type | FS-A | FS-B |
|---|---|---|
| Hydrogen (wt %) | 6.97 | 8.63 |
| Carbon (wt %) | 91.64 | 90.68 |
| Sulfur (wt %) | 0.81 | <0.01% |
| Nitrogen (wt %) | 0.35 | 0.04 |
| Oxygen (wt %) | 0.23 | 0.65 |
| Specific Gravity at 60° F. [ASTM D-287] | 1.1029 | 1.0292 |

TABLE 2

Reactor Geometry and Operating Conditions

| Parameters | Carbon Black No. 1 | 2 | 3 | 4 |
|---|---|---|---|---|
| D-1 (m) | 0.18 | 0.18 | 0.18 | 0.18 |
| D-2 (m) | 0.13 | 0.11 | 0.11 | 0.11 |
| D-3 (m) | NA | 0.15 | 0.15 | 0.15 |
| D-4 (m) | NA | 0.23 | 0.23 | 0.23 |
| D-5 (m) | 0.69 | 0.23 | 0.23 | 0.23 |
| D-6 (m) | NA | 0.46 | 0.46 | 0.46 |
| D-7 (m) | NA | 0.69 | 0.69 | 0.69 |
| D-8 (m) | 0.91 | 0.91 | 0.91 | 0.91 |
| D-9 (m) | 0.69 | 0.69 | 0.69 | 0.69 |
| L-1 (m) | 0.61 | 0.61 | 0.61 | 0.61 |
| L-2 (m) | 0.30 | 0.30 | 0.30 | 0.30 |
| L-3 (m) | NA | 0.23 | 0.23 | 0.23 |
| L-4 (m) | NA | 0.46 | 0.46 | 0.46 |
| L-5 (m) | 0.38 | 1.60 | 1.60 | 1.60 |
| L-6 (m) | NA | 1.60 | 1.60 | 1.60 |
| L-7 (m) | NA | 1.60 | 1.60 | 1.60 |
| L-8 (m) | 9.48 | 7.88 | 7.88 | 7.88 |
| L-9 (m) | 8.00 | 8.00 | 8.00 | 8.00 |
| A (m) | NA | NA | NA | 2.9 |
| B (m) | NA | NA | 4.6 | 4.6 |
| Q (m) | 13.6 | 16.8 | 16.8 | 16.8 |
| Combustion Air (nm³/h)* | 1600 | 1600 | 1600 | 1600 |
| Combustion Air Preheat (K) | 773 | 773 | 773 | 773 |

TABLE 2-continued

Reactor Geometry and Operating Conditions

|  | Carbon Black No. | | | |
| --- | --- | --- | --- | --- |
| Parameters | 1 | 2 | 3 | 4 |
| Oxygen Enrichment in Combustion Air (%) | 29 | 25 | 20.9 | 20.9 |
| Burner Natural Gas (nm³/h)* | 204 | 167 | 132 | 132 |
| Feedstock Type | FS-A | FS-B | FS-B | FS-B |
| Feedstock Injection Orifice Diameter (cm) | 0.094 | 0.071 | 0.071 | 0.071 |
| No. Feedstock Injection Orifices | 4 | 6 | 6 | 6 |
| Feedstock Rate (kg/h) | 468 | 317 | 252 | 252 |
| Feedstock Temp. (K) | 448 | 443 | 438 | 448 |
| $K^+$ Concentration in Feedstock (ppm) | 652 | 558 | 558 | 558 |
| $Ca^{2+}$ Concentration in Feedstock (ppm) | 668 | 668 | 668 | 668 |
| Intermediate Water Rate (kg/h) | 0 | 0 | 0 | 150 |
| Intermediate Oxygen Rate (nm³/h)* | 0 | 0 | 20 | 70 |
| Primary Combustion (%)** | 125 | 125 | 125 | 125 |
| Overall Combustion (%)*** | 37.0 | 41.0 | 43.4 | 49.6 |
| Quench Water Rate (kg/h) | 655 | 419 | 340 | 444 |

*nm³ refers to normal cubic meters, where "normal" refers to the gas volume corrected to 25° C. and 1 atm pressure.
**Primary combustion is defined as the percentage of oxygen added to the combustion zone 1 compared to the total amount of oxygen required to stoichiometrically react with the natural gas added to combustion zone 1.
***Overall combustion is defined as the percentage of oxygen added to the entire reactor compared to the total amount of oxygen required to stoichiometrically react with all the fuel streams added to the entire reactor.

Example 2

EDLC Sample Preparation Procedure

The four examples of carbon black (CB) 1-4 disclosed in Example 1 were analyzed for surface area, structure, and EDLC performance. With respect to surface area and structure, reference is made to carbon blacks 1-4 as identified by the corresponding number in solid square symbols in parallelogram ABCD in FIG. 1.

For each of the four examples of carbon black (CB) products, a dispersion of dry carbon black powder and polytetrafluoroethylene (PTFE) (available as 60 wt % solution from Aldrich) in water was prepared. The solid content of dispersion did not exceed 10 wt %. After homogenization, the mixture was dried at 85° C. over 48 hours to dry the water out so that the moisture content of the remaining carbon black/PTFE did not exceed 2 wt %. After grinding the resultant carbon black/PTFE composite with a commercial blender, the dry carbon black powder containing 12 wt % PTFE was rolled into a 145±10 micron thick electrode by a stainless steel rod. The PTFE served as the binder. In the case of a reference activated carbon sample (RP-20), the procedure was analogous except the activated carbon was additionally added with 10 wt % of acetylene black (Denka) to serve as conductive filler. The electrode disks were then punched with a use of a circular (1.35 cm in diameter) die. The mass of each electrode was measured. The combined dry mass of carbon black (from example Carbon Black 1, 2, 3 or 4) and PTFE in two electrodes varied from 15 to 22 mg and depended on the carbon black. A 200 nm layer of aluminum thermally evaporated onto one side of electrodes served as a current collector. Before the EDLC assembly, the electrodes were dried overnight at 85° C. and soaked in 1.8M TEMABF$_4$/acetonitrile electrolyte (Honeywell) in a glove box overnight. After soaking, two electrodes and a 25 micron thick separator (Celgard 2500) were used to assemble a symmetrical EDLC in a hermetic test cell (Hohsen Corporation, Japan). From the measurements of mass and dimensions of electrodes, the electrode density was calculated.

EDLC Performance Measurement Procedures

The performance of Carbon Blacks 1 through 4 in an EDLC device were determined. A commercial grade of carbon black (BP2000, Cabot Corporation) and activated carbon (RP-20, Kuraray Chemicals) materials, which are used for commercial EDLC applications, were included for comparison and reference. The nitrogen BET surface area and CDBP value of the carbon blacks of Carbon Blacks 1-4 and comparative samples also were determined (Carbon Blacks 1-4 are also indicated in FIG. 1). The results are shown in Table 3.

Measurements of EDLC performance were done with an Autolab potentiostat-galvanostat (Eco Chemie, the Netherlands), which was also equipped with a frequency response analysis (FRA) module. The gravimetric capacitance of an EDLC cell was derived at 2V from the cyclic voltametry scans performed at 50 mV/s scan rates by dividing the cell capacitance C=i/(dV/dt) by total carbon mass in the cell, where i is the measured current and dV/dt is the voltage scan rate. This capacitance was also confirmed by the constant current charge-discharge measurements. The volumetric EDLC cell capacitance was calculated as the product of gravimetric capacitance by the electrode density. The gravimetric (or volumetric) EDLC capacitance of cell (two electrodes) multiplied by a factor of four yields the gravimetric (or volumetric) capacitance of single electrode, which is also presented in Table 3.

The asterisk in Table 3 means that the electrodes prepared from Carbon Black 1 contained 10 wt % PTFE compared to others that contained 12 wt % of PTFE. This difference is only believed to influence the ESR.

TABLE 3

| Materials | N2 BET surface area (m2/g) | CDBP (mL/100 g) | DBP (mL/100 g) | electrode packing density (g/cm3) | cell gravimetric capacitance @2 V (F/g) | cell volumetric capacitance @2 V (F/cm3) | 1 kHz ESR (Ohm) | 0.1 Hz ESR (Ohm) | electrode capacitance @2 V (F/g) |
| --- | --- | --- | --- | --- | --- | --- | --- | --- | --- |
| carbon black 1 | 1358 | 189 | 195 | 0.58 | 24.5 | 14.21 | 0.31* | 0.67* | 98 |
| carbon black 2 | 1813 | 181 | 208 | 0.6 | 29.25 | 17.55 | 0.37 | 0.73 | 117 |

TABLE 3-continued

| Materials | N2 BET surface area (m2/g) | CDBP (mL/100 g) | DBP (mL/100 g) | electrode packing density (g/cm3) | cell gravimetric capacitance @2 V (F/g) | cell volumetric capacitance @2 V (F/cm3) | 1 kHz ESR (Ohm) | 0.1 Hz ESR (Ohm) | electrode capacitance @2 V (F/g) |
|---|---|---|---|---|---|---|---|---|---|
| carbon black 3 | 1853 | 196 | 216 | 0.56 | 30 | 16.8 | 0.31 | 0.62 | 120 |
| carbon black 4 | 1923 | 240 | 287 | 0.47 | 30 | 14.1 | 0.31 | 0.62 | 120 |
| BP2000 | 1437 | 280 | 330 | 0.4 | 23.25 | 9.3 | 0.46 | 0.75 | 93 |
| RP-20 | 1800 | | | 0.61 | 28.5 | 17.385 | | | 114 |

The ESR at various frequencies was obtained from the impedance spectroscopy scans using the FRA module. A representative example of cyclic voltametry (50 mV/s scan rate) and impedance spectroscopy (50 mV amplitude, 0V bias) scans determined for Carbon Black 2 is shown in FIGS. 4a and 4b. The behavior of capacitance as a function of frequency for Carbon Black 2 (the present invention) and two comparison carbon blacks, as shown in FIG. 5, was obtained from the impedance spectroscopy data and the equation $C=-1/(2\pi fZ'')$, where f is frequency, and $Z''$ is the imaginary part of impedance. The frequency dependence of gravimetric capacitance of Carbon Black 2 (dashed line), BP2000 (solid line), and RP20 activated carbon (crosses) are plotted in FIG. 5. The data for RP-20 was referenced from literature (A. Janes et al., Carbon 45, 1226-1233 (2007)), and superimposed with the experimental data for Carbon Black 2. The experimental measurements taken for RP20 were equivalent to the published data.

As evident from these data and results, example Carbon Blacks 1-4 illustrating the present invention have improvement in ESR and comparable gravimetric and volumetric capacitance as compared to the activated carbon reference. These results show that the present carbon black can be used as a drop-in replacement of activated carbons in the EDLC. The present examples of carbon black outperformed the commercial carbon black (BP2000) used for EDLC applications. Comparison of the capacitance of the present carbon black with the activated carbon (RP-20, Kuraray Chemicals) as a function of frequency also demonstrated that the present invention can operate an order of magnitude faster (see, e.g., FIG. 5). As indicated, the data for the RP-20 (represented by crosses in FIG. 5) was based on the above-indicated A. Janes et al. reference, and superimposed with the present results. Such a comparison is valid because the literature and the present electrode used the same electrolyte, TEMABF4 (AN), and the literature's and the present electrode's gravimetric capacitance values are 115 F/g and 117 F/g (for the present invention's Carbon Black 2), respectively. Measurements made for RP-20 also have shown an electrode capacitance of 114 F/g for this activated carbon material, as indicated in Table 3.

Example 3

The surface area, structure, and EDLC performance of one of the present invention's carbon black of Example 1 (Carbon Black 1) were determined and compared with those of carbon blacks made according to methods disclosed in U.S. Patent Application Publication No. 2009/0208751 A1 (c1, c2, and c3 as shown in FIG. 1). The EDLC sample preparation and performance measurement procedures used were similar to those in Example 2. The results are set forth in Table 4. As shown in the results in Table 4, Carbon Black 1 had superior overall characteristics and performance with respect to surface area, structure, and EDLC performance as compared to the comparative materials.

TABLE 4

| Materials | N2 BET surface area (m2/g) | CDBP (mL/100 g) | DBP (mL/100 g) | electrode packing density (g/cm3) | cell gravimetric capacitance @2 V (F/g) | cell volumetric capacitance @2 V (F/cm3) |
|---|---|---|---|---|---|---|
| carbon black 1 | 1358 | 189 | 195 | 0.58 | 24.5 | 14.21 |
| c1 | 1010 | 322 | 400 | 0.3 | 18.8 | 5.6 |
| c2 | 1642 | 298 | 370 | | | |
| c3 | 1627 | 250 | 278 | 0.41 | 21.9 | 9 |

Example 4

Figure 6:
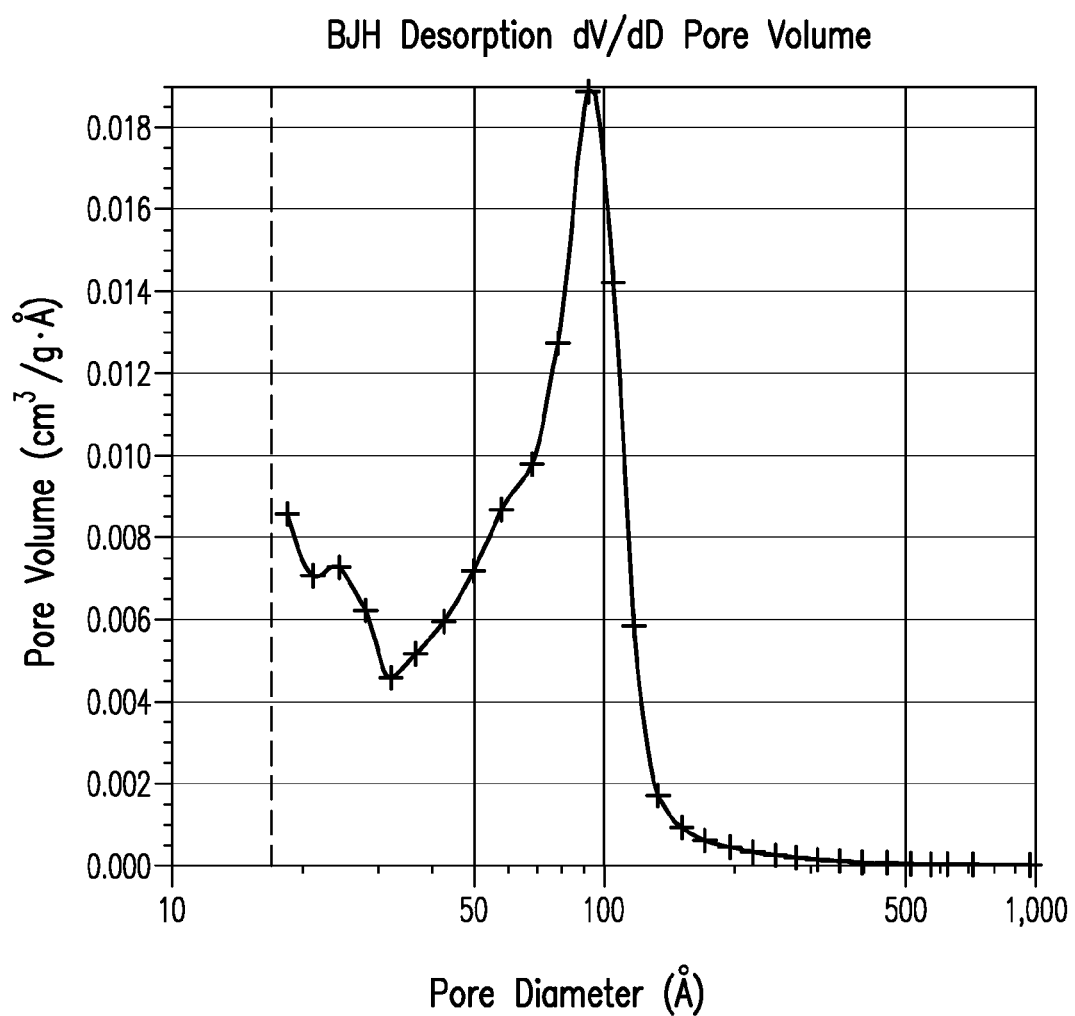
FIGS. 6 and 7 are graphs showing pore size distribution (cm$^3$/g·Angstrom v. Angstrom) for an example of the present carbon black (Carbon Black 2) (FIG. 6) and a prior comparative material c3 (FIG. 7).

The pore size distribution and pore volume of one of the carbon blacks of Example 1 (Carbon Black 2) was determined and compared with those of one of the carbon blacks (c3) made according methods disclosed in U.S. Patent Application Publication No. 2009/0208751 A1, and the results are shown in FIGS. 6 (Carbon Black 2) and 7 (c3). Pore size distributions and pore volumes were measured by BJH nitrogen desorption. The BJH nitrogen desorption method of measuring pore size distributions and pore volumes is described in ASTM 4222-03 and ASTM 4641-94, the entireties of which are incorporated herein by reference, and this method was used for the pore size measurements described herein.

Figure 7:
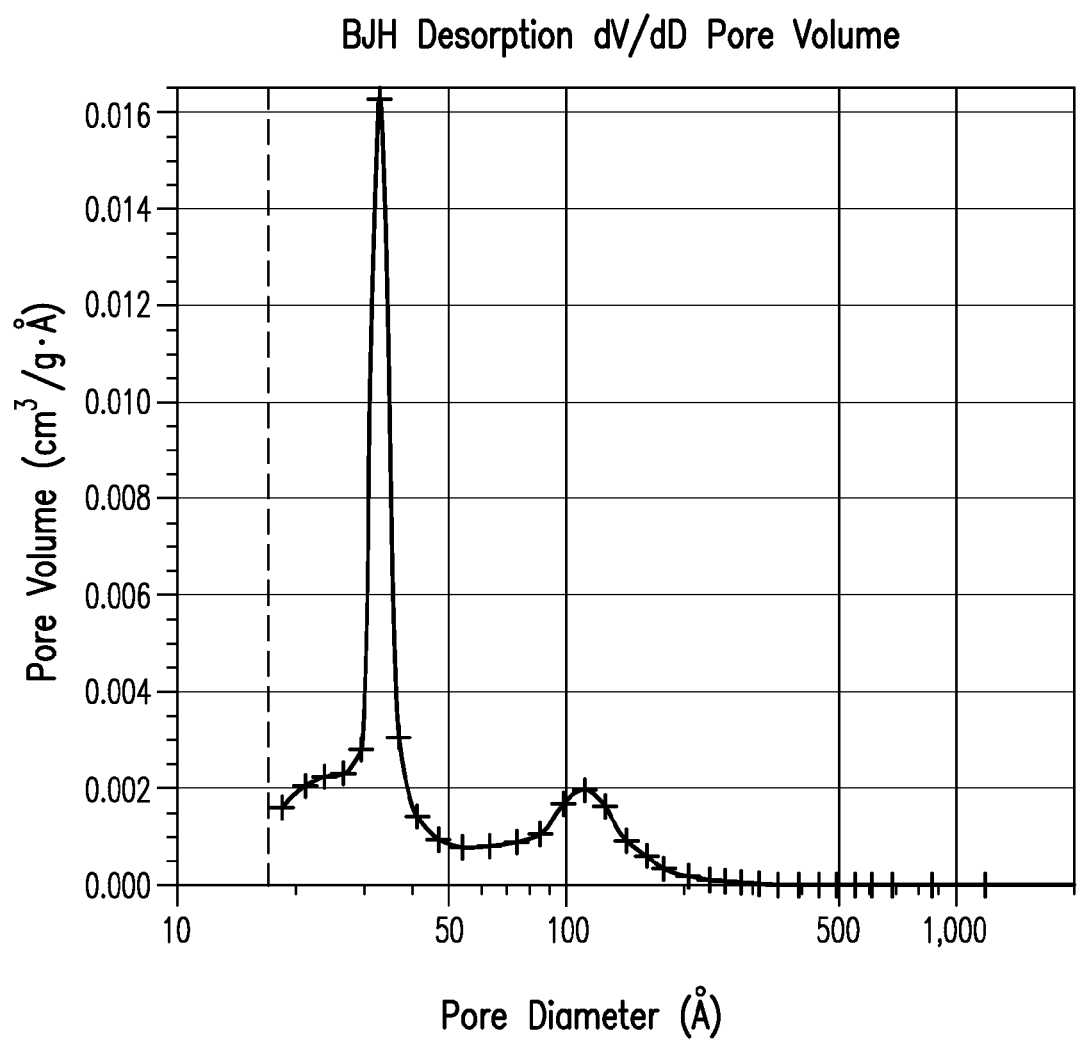

As seen from a comparison of the results in FIGS. 6 and 7, the respective profiles and peaks in pore size distribution for the Carbon Black 2 and steam-etched carbon blacks are significantly different. The results show that the pore size distribution and pore volume characteristics of the example of the present carbon black (Carbon Black 2) were significantly different from the carbon black made according methods disclosed in U.S. Patent Application Publication No. 2009/0208751 A1.

Example 5

The water spreading pressure of the carbon blacks of Example 1 were determined and compared to a commercial grade of carbon black (BP2000, Cabot Corporation) and activated carbon (RP-20, Kuraray Chemicals) materials, and also carbon blacks (c1, c2, c3) made according to the methods in U.S. Patent Application Publication No. 2009/0208751 A1. The results are shown in Table 5.

The water spreading pressure was measured by observing the mass increase of a sample as it adsorbs water from a controlled atmosphere. In the test, the relative humidity (RH) of the atmosphere around the sample is increased from 0% (pure nitrogen) to ~100% (water-saturated nitrogen). If the sample and atmosphere are always in equilibrium, the water spreading pressure ($\pi_e$) of the sample is defined as:

$$\pi_e = \frac{RT}{A} \int_o^{P_o} \Gamma d\ln P$$

where R is the gas constant, T is the temperature, A is the nitrogen surface area of the sample, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve.

The following procedure was used to measure the water spreading pressure. Before analysis, 100 mg of the carbon black to be analyzed is dried in an oven at 125° C. for 30 minutes. After ensuring that the incubator in a Surface Measurement Systems DVS1 instrument (supplied by SMS Instruments, Monarch Beach, California) has been stable at 25° C. for 2 hours, sample cups are loaded in both the sample and reference chambers. The target RH is set to 0% for 10 minutes to dry the cups and to establish a stable mass baseline. After discharging static and taring the balance, approximately 8 mg of carbon black is added to the cup in the sample chamber. After sealing the sample chamber, the sample is allowed to equilibrate at 0% RH. After equilibration, the initial mass of the sample is recorded. The relative humidity of the nitrogen atmosphere is then increased sequentially to levels of approximately 5, 10, 20, 30, 40, 50, 60, 70, 78, 87, and 92% RH, with the system allowed to equilibrate for 20 minutes at each RH level. The mass of water adsorbed at each humidity level is recorded, from which water spreading pressure is calculated via the above equation.

TABLE 5

Water Spreading Pressure

| | WSP (mJ/m$^2$) |
|---|---|
| Carbon Black 1 | 15.5 |
| Carbon Black 2 | 11 |
| Carbon Black 3 | 12.6 |
| Carbon Black 4 | 13 |
| BP2000 | 13.4 |
| RP-20 | 19.3 |
| c1 | 8 |
| c2 | 3.3 |
| c3 | 2.5 |

The water spreading pressure (WSP) is a measure of the interaction energy between the carbon black surface and water vapor. Lower WSP represents more hydrophobic carbon black.

The results in Table 5 show that Carbon Blacks 1-4 representing examples of the present invention's carbon blacks have higher WSP than the steam-etched carbon blacks (c1, c2, c3), are comparable to or higher than the BP2000 carbon black (BP2000, Cabot Corporation), and are closer in WSP value to the activated carbon (RP-20, Kuraray Chemicals) materials than the carbon blacks made according methods disclosed in U.S. Patent Application Publication No. 2009/0208751 A1.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. It is further understood that for any range provided herein, the numerical ranges can be "about" these ranges, and vice versa, where a range is provided using "about" ranges, these ranges can be precisely the number ranges provided. Any combination of embodiments, and/or ingredients and/or components and/or properties recited herein can be made herein and is considered part of the present invention Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An energy storage device comprising an electrode or a part thereof, wherein said electrode comprises carbon black having:
   a) a nitrogen BET surface area (BET) of from 650 m$^2$/g to 2050 m$^2$/g;
   b) a dibutyl phthalate adsorption value for the carbon black determined after controlled compression (CDBP valued in mL/100 g of from about (−2.8+(b* BET)) to about (108+(b* BET)), where b is 0.087 and BET is expressed in m$^2$/g; and
   c) an apparent density ($\rho$, g/cm$^3$) of at least about 0.820+q* BET, where q=−2.5×10$^{-4}$, as determined at a compressive force (P) of 200 kgf/cm$^2$ on dry carbon black powder.

2. The energy storage device of claim 1, wherein said electrode has a thickness of from about 50 microns or less.

3. The energy storage device of claim 1, wherein said electrode has a thickness of from about 10 microns or less.

4. The energy storage device of claim 1, wherein said electrode further comprises a second carbon black, which is different from said carbon black.

5. The energy storage device of claim 1, wherein said electrode has an electrode density of from about 0.30 g/cc to about 0.90 g/cc.

6. The energy storage device of claim 1, wherein the energy storage device is a battery or fuel cell.

7. The energy storage device of claim 1, wherein the energy storage device is a pseudocapacitor or asymmetric electrochemical capacitor.

8. The energy storage device of claim 1, wherein the energy storage device is a hybrid of battery and electrochemical capacitor.

9. The energy storage device of claim 1, wherein the energy storage device is an electrochemical double layer capacitor (EDLC).

10. The energy storage device of claim 1, comprising an electrochemical double layer capacitor (EDLC) comprising first and second electrodes each comprising said carbon black, which said carbon black is the same or different from each other, and a cell comprising said first and second electrodes, wherein said EDLC having a gravimetric capacitance of at least about 80 Farads/g for an electrode thereof and at least about 20 Farads/g for said cell.

11. The energy storage device of claim 1, comprising an EDLC cell having at least about 10 F/mL capacitance.

12. The energy storage device of claim 1, wherein said carbon black having a CDBP value of from about 70 mL/g to about 280 mL/g.

13. The energy storage device of claim 1, having a CDBP value of from about 80mL/100 g to about 270 mL/100 g.

14. The energy storage device of claim 1, having a CDBP value of from about 90mL/100 g to about 260 mL/100 g.

15. The energy storage device of claim 1, having a CDBP value of from about 120 mL/100 g to about 230 mL/100 g.

16. The energy storage device of claim 1, wherein the nitrogen BET surface area is 650 $m^2$/g to about 1,950 $m^2$/g.

17. The energy storage device of claim 1, wherein the nitrogen BET surface area is about 700 $m^2$/g to about 1,900 $m^2$/g.

18. The energy storage device of claim 1, wherein the nitrogen BET surface area is 650 $m^2$/g to about 1,950 $m^2$/g, and the CDBP value is from about 90 mL/100 g to about 260 mL/100 g.

19. The energy storage device of claim 1, wherein the nitrogen BET surface area is about 700 $m^2$/g to about 1,900 $m^2$/g, and the CDBP value is from about 120 mL/100 g to about 230 mL/100 g.

20. The energy storage device of claim 1, wherein said carbon black further has one or more of the following properties:
   a) an average primary particle size of from about 8 nm to about 100 nm;
   b) an average aggregate particle size of from about 8 nm to about 500 nm;
   c) an Iodine number value of from about 1000 mg/g to about 2200 mg/g;
   d) a volatiles percent of from 0 to about 4%;
   e) an ash percent of from 0 to about 3%;
   f) a 325 mesh sieve residue (maximum) of from about 5 ppm to about 120 ppm;
   g) a sulfur content of from 0 to about 0.2%; and
   h) a moisture percent of from 0 to about 8%.

21. The energy storage device of claim 20, wherein said carbon black has at least four of said properties a)- h).

22. The energy storage device of claim 1, wherein said carbon black has:
   a) an average primary particle size of from about 8 to about 100 nm; and
   b) an average aggregate particle size of from about 8 to about 500 nm.

23. The energy storage device of claim 1, further having a volatiles percent from 0 to about 4%.

24. The energy storage device of claim 1, wherein said carbon black has attached at least one organic group.

25. The energy storage device of claim 1, wherein said carbon black has attached at least one organic group comprising an aromatic group or an alkyl group, wherein said aromatic group or alkyl group is directly attached to said carbon black.

26. The energy storage device of claim 1, wherein said carbon black has attached at least one organic group that comprises an electron donor group, an electron acceptor group, or both.

* * * * *